United States Patent
Deshpande

(10) Patent No.: US 11,849,012 B2
(45) Date of Patent: *Dec. 19, 2023

(54) TRIP TIME ESTIMATION FOR TRANSPORT CONTROL PROTOCOL

(71) Applicant: Google LLC, Mountain View, CA (US)

(72) Inventor: Akash Deshpande, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,243

(22) Filed: Mar. 2, 2022

(65) Prior Publication Data
US 2022/0191307 A1    Jun. 16, 2022

Related U.S. Application Data

(63) Continuation of application No. 17/126,176, filed on Dec. 18, 2020, now Pat. No. 11,297,169, which is a
(Continued)

(51) Int. Cl.
*H04L 69/163*    (2022.01)
*G06F 9/455*    (2018.01)
(Continued)

(52) U.S. Cl.
CPC ........ *H04L 69/163* (2013.01); *G06F 9/45558* (2013.01); *H04L 43/0864* (2013.01);
(Continued)

(58) Field of Classification Search
CPC . H04L 69/163; H04L 43/0864; H04L 43/106; H04L 47/193; H04L 47/283; G06F 9/45558
(Continued)

(56) References Cited

U.S. PATENT DOCUMENTS 7,304,951 B2 * 12/2007 Rhee ................ H04L 29/06
                                                                370/235
9,444,688 B2 *  9/2016 Lee .................. H04W 28/0273
(Continued)

FOREIGN PATENT DOCUMENTS

JP       2011-101360 A    5/2011
KR   10-2015-0040154 A    4/2015
(Continued)

OTHER PUBLICATIONS

KPO, Office Action relating to Application No. 10-2021-7041183, dated May 25, 2022, received on Jun. 2, 2022.
(Continued)

*Primary Examiner* — Tauqir Hussain
(74) *Attorney, Agent, or Firm* — Honigman LLP; Brett A. Krueger

(57) ABSTRACT

A method for estimation of performance characteristics for transport control protocol includes sparsely sampling, at a middlebox, a plurality of packets from a transport control protocol (TCP) connection between a source endpoint and a destination endpoint through the middlebox. For each packet of the sampled plurality of packets, the method includes generating a time stamp when the packet is sampled and recording a sequence number and an acknowledgment number for the respective packet. The acknowledgment number is recorded when the acknowledgment number exists for the respective packet. The method also includes generating an estimated performance characteristic for the TCP connection between the source endpoint and the destination endpoint through the middlebox over the period of time based on at least two of a respective time stamp, a respective sequence number, or a respective acknowledgment number from one or more of the sampled plurality of packets.

20 Claims, 12 Drawing Sheets

Related U.S. Application Data continuation of application No. 16/416,626, filed on May 20, 2019, now Pat. No. 10,887,432.

(51) Int. Cl.
*H04L 43/0864* (2022.01)
*H04L 43/106* (2022.01)
*H04L 47/193* (2022.01)
*H04L 47/283* (2022.01)

(52) U.S. Cl.
CPC .......... *H04L 43/106* (2013.01); *H04L 47/193* (2013.01); *H04L 47/283* (2013.01); *G06F 2009/45595* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 9,838,325 | B2* | 12/2017 | Lee ................. | H04L 41/0896 |
| 10,116,531 | B2* | 10/2018 | Alizadeh Attar ..... | H04W 72/54 |
| 10,218,596 | B2* | 2/2019 | Ben-Dvora ......... | H04L 43/0864 |
| 10,244,425 | B2* | 3/2019 | Chang ................. | H04L 47/225 |
| 11,297,169 | B2* | 4/2022 | Deshpande .............. | H04L 43/20 |
| 2005/0141419 | A1* | 6/2005 | Bergamasco ........... | H04L 47/12 |
| | | | | 370/230 |
| 2009/0222553 | A1* | 9/2009 | Qian ...................... | H04L 41/14 |
| | | | | 709/224 |
| 2013/0201858 | A1* | 8/2013 | Varma .................. | H04L 43/106 |
| | | | | 370/252 |
| 2014/0241163 | A1* | 8/2014 | Lee ..................... | H04L 41/0896 |
| | | | | 370/235 |
| 2015/0359016 | A1* | 12/2015 | Barany .................. | H04L 43/10 |
| | | | | 709/224 |
| 2016/0134546 | A1* | 5/2016 | Anderson .............. | H04L 47/25 |
| | | | | 370/235 |
| 2017/0054649 | A1* | 2/2017 | Mamidwar ........... | H04L 65/612 |
| 2017/0373950 | A1* | 12/2017 | Szilagyi ................ | H04L 43/091 |
| 2021/0105344 | A1* | 4/2021 | Deshpande ........... | H04L 47/193 |
| 2021/0185276 | A1* | 6/2021 | Peters .................... | G06V 20/41 |
| 2022/0385587 | A1* | 12/2022 | Vaduvatha ............ | H04L 1/1832 |

FOREIGN PATENT DOCUMENTS

| | | | | |
|---|---|---|---|---|
| KR | 10-2015-0132329 A | | 11/2015 | |
| WO | WO-2004088858 A2 | * | 10/2004 | ........... H04L 1/0002 |

OTHER PUBLICATIONS

Yang et al., "TCP Congestion Avoidance Algorithm Identification," IEEE, 2011 31st International Conference on Distributed Computing Systems, pp. 310-321, Jun. 2011, 12 pages.

Qian et al., "TCP Revisited: A Frest Look at TCP in the Wild," In Proceedings of the 9th ACM SIGCOMM Conference on Internet Measurement Conference, IMC '09, pp. 1-14, 2009, 14 pages.

Wei et al., "FAST TCP: Motivation, Architecture, Algorithms, Performance," IEEE/ACM Transactions on Networking, vol. 14, No. 6, pp. 1246-1259, Dec. 2006, 14 pages.

Brakmo et al., "TCP Vegas: New Techniques for Congestion Detection and Avoidance," TR 94 04, pp. 1-19 Feb. 16, 1994, 19 pages.

* cited by examiner

TRIP TIME ESTIMATION FOR TRANSPORT CONTROL PROTOCOL

CROSS REFERENCE TO RELATED APPLICATIONS

This U.S. patent application is a continuation of, and claims priority under 35 U.S.C. 120 from, U.S. patent application Ser. No. 17/126,176, filed on Dec. 18, 2020, which is a continuation of U.S. patent application Ser. No. 16/416,626, filed on May 20, 2019, now U.S. Pat. No. 10,887,432. The disclosures of these prior applications are considered part of the disclosure of this application and are hereby incorporated by reference in their entireties.

TECHNICAL FIELD

This disclosure relates to trip time estimation for transport control protocol.

BACKGROUND

Conventionally, processes running on a node can help understand the performance of a transport control protocol (TCP) connection between nodes (or endpoints). For example, a system could be deployed to capture a packet's round trip time (RTT) by measuring a starting time when the packet is sent by the node and an acknowledgment lime when an acknowledgment is received by the node. Yet, as the use of middleboxes increases the implementation of intermediary nodes between more conventional endpoints, measuring TCP performance at an endpoint must account for new performance measurement techniques to promote TCP connection optimization.

SUMMARY

One aspect of the disclosure provides a method for estimation of performance characteristics for transport control protocol. The method includes sparsely sampling, at data processing hardware of a middlebox, a plurality of packets from one or more transport control protocol (TCP) connections between one or more source endpoints and one or more destination endpoints transiting through the middlebox over a period of time. For each packet of the sampled plurality of packets, the method includes generating, by the data processing hardware, a time stamp when the packet is sampled and recording, by the data processing hardware, a sequence number and an acknowledgment number for the respective packet. The method further includes generating, by the data processing hardware, an estimated performance characteristic for the one or more TCP connections between the one or more source endpoints and the one or more destination endpoints transiting through the middlebox over the period of time based on at least two of a respective time stamp, a respective sequence number, or a respective acknowledgment number from one or more of the sampled plurality of packets.

In some implementations, the method includes identifying, by the data processing hardware, a first sequence number recorded for a first packet of the sampled plurality of packets transferred between the middlebox and the destination endpoint. Here, the method also includes determining, by the data processing hardware, whether the first sequence number recorded for the first packet matches any of the acknowledgment numbers recorded for sampled plurality of packets transferred between the destination endpoint and the middlebox. In this implementation, when the first sequence number matches the acknowledgment number recorded for a second packet of the sampled plurality of packets, the method includes determining, by the data processing hardware, a first trip time between the middlebox and the destination endpoint based on a difference between the respective time stamps of the first packet and the second packet. In this implementation, when the first sequence number fails to match any of the recorded acknowledgment numbers recorded for the sampled plurality of packets, the method includes estimating, by the data processing hardware, a respective time stamp for a first un-sampled packet from the TCP connection by interpolating the acknowledgment numbers recorded for the sampled plurality of packets. Here, the first un-sampled packet is associated with a corresponding acknowledgment number that matches the first sequence number. This implementation further includes determining, by the data processing hardware, the first trip time between the middlebox and the destination endpoint based on a difference between the first time stamp generated for the first packet and the respective time stamp estimated for the first un-sampled packet.

In some examples, the method includes identifying, by the data processing hardware, a second sequence number recorded for a third packet of the sampled plurality of packets, the third packet transferred between the middlebox and the source endpoint. Here the method also includes determining, by the data processing hardware, whether the second sequence number recorded for the third packet matches any acknowledgment numbers recorded for the sampled plurality of packets transferred between the source endpoint and the middlebox. In this example, when the second sequence number matches the acknowledgment number recorded for a fourth packet of the sampled plurality of packets, the method includes determining, by the data processing hardware, a second trip time between the middlebox and the source endpoint based on a difference between the respective time stamps generated for the third packet and the fourth packet. In this example, when the second sequence number fails to match any of the acknowledgment numbers recorded for the sampled plurality of packets, the method includes estimating, by the data processing hardware, a respective time stamp for a second un-sampled packet from the TCP connection by interpolating the acknowledgment numbers recorded for the sampled plurality of packets, the second un-sampled packet associated with a corresponding acknowledgment number that matches the second sequence number and determining the second trip time between the middlebox and the destination endpoint based on a difference between the third time stamp generated for the third packet and the respective time stamp estimated for the second un-sampled packet. Generating the estimated performance characteristic for the TCP connection may also include calculating a round trip time between the source endpoint and the destination endpoint through the middlebox by summing the first trip time between the middlebox and the destination endpoint and the second trip time between the middlebox to the source endpoint.

In other configurations, the method includes estimating a respective time for an unrecorded acknowledgment number is based on interpolation of the recorded acknowledgment numbers for the sampled plurality of packets. The method may include estimating a respective time for an unrecorded sequence number based on interpolation of the recorded sequence numbers for the sampled plurality of packets.

In some implementations, generating the estimated performance characteristic for the TCP connection includes determining, by the data processing hardware, a slope of acknowledgment numbers over the period of time based on the acknowledgment numbers recorded for the sampled plurality of packets transferred from the destination endpoint to the source endpoint through the middlebox and generating a throughput based on the slope of acknowledgment numbers where the throughput corresponds to a rate of packet transfer from the source endpoint to the destination endpoint through the middlebox. In other implementations, generating the estimated performance characteristic for the TCP connection includes determining a slope of acknowledgment numbers over time based on the acknowledgment numbers recorded for the sampled plurality of packets transferred from the source endpoint, to the destination endpoint through the middlebox and generating a throughput based on the slope of the acknowledgment numbers where the throughput corresponds to a rate of packet transfer from the destination endpoint to the source endpoint through the middlebox.

In some examples, the method includes, at a given instance in time, receiving, at the data processing hardware, a first packet communicated over the TCP connection from the source endpoint, the first packet including a first sequence number and a first acknowledgment number and receiving a second packet communicated over the TCP connection from the destination endpoint, the second packet including a second sequence number and a second acknowledgment number. Here, the method also includes estimating, by the data processing hardware, a respective window size for the source endpoint by determining a difference between the first sequence number associated with the first packet and the second acknowledgment number associated with the second packet. In these examples, the method may further include estimating, by the data processing hardware, a respective window size for the destination endpoint by determining a difference between the second sequence number associated with the second packet and the first acknowledgment number associated with the first packet.

In some implementations, sparsely sampling the plurality of packets includes sampling less than all packets from the TCP connection between the source endpoint and the destination endpoint. Sparsely sampling the plurality of packets may include uniformly sampling packets from the TCP connection in a stateless and systematic manner. The source endpoint may be a user equipment (UE) communicating with a remote distributed network and the destination endpoint corresponds to a server in communication with the remote distributed network.

Another aspect of the disclosure provides a system for estimation of performance characteristics tor transport control protocol. The system includes data processing hardware and memory hardware in communication with the data processing hardware. The memory hardware stores instructions that when executed on the data processing hardware cause the data processing hardware to perform operations. The operations include sparsely sampling, at a middlebox, a plurality of packets from one or more transport control protocol (TCP) connections between one or more source endpoints and one or more destination endpoints transiting through the middlebox over a period of time. For each packet of the sampled plurality of packets, the operations include generating a time stamp when the packet is sampled and recording a sequence number and an acknowledgment number for the respective packet. The operations further include generating an estimated performance characteristic for the one or more TCP connections between the one or more source endpoints and the one or more destination endpoints transiting through the middlebox over the period of time based on at least two of a respective time stamp, a respective sequence number, or a respective acknowledgment number from one or more of the sampled plurality of packets.

In some implementations, the operations include identifying a first sequence number recorded for a first packet of the sampled plurality of packets transferred between the middlebox and the destination endpoint. Here, the operations also include determining whether the first sequence number recorded for the first packet matches any of the acknowledgment numbers recorded for sampled plurality of packets transferred between the destination endpoint and the middlebox. In this implementation, when the first sequence number matches the acknowledgment number recorded fora second packet of the sampled plurality of packets, the operations include determining a first trip time between the middlebox and the destination endpoint based on a difference between the respective time stamps of the first packet and the second packet. In this implementation, when the first sequence number fails to match any of the recorded acknowledgment numbers recorded for the sampled plurality of packets, the operations include estimating a respective time stamp for a first un-sampled packet from the TCP connection by interpolating the acknowledgment numbers recorded for the sampled plurality of packets. Here, the first un-sampled packet is associated with a corresponding acknowledgment number that matches the first sequence number. This implementation further includes determining the first trip time between the middlebox and the destination endpoint based on a difference between the first time stamp generated for the first packet and the respective time stamp estimated for the first un-sampled packet.

In some examples, the operations include identifying a second sequence number recorded for a third packet of the sampled plurality of packets, the third packet transferred between the middlebox and the source endpoint. Here the operations also include determining whether the second sequence number recorded for the third packet matches any acknowledgment numbers recorded for the sampled plurality of packets transferred between the source endpoint and the middlebox. In this example, when the second sequence number matches the acknowledgment number recorded for a fourth packet of the sampled plurality of packets, the method includes determining, by the data processing hardware, a second trip time between the middlebox and the source endpoint based on a difference between the respective time stamps generated for the third packet and the fourth packet. In this example, when the second sequence number fails to match any of the acknowledgment numbers recorded for the sampled plurality of packets, the operations include estimating a respective time stamp for a second un-sampled packet from the TCP connection by interpolating the acknowledgment numbers recorded for the sampled plurality of packets, the second un-sampled packet associated with a corresponding acknowledgment number that matches the second sequence number and determining the second trip time between the middlebox and the destination endpoint based on a difference between the third time stamp generated for the third packet and the respective time stamp estimated for the second un-sampled packet. Generating the estimated performance characteristic for the TCP connection may also include calculating a round trip time between the source endpoint and the destination endpoint through the middlebox by summing the first trip time between the middlebox and the destination endpoint and the second trip time between the middlebox to the source endpoint.

In other configurations, the operations include estimating a respective time for an unrecorded acknowledgment number is based on interpolation of the recorded acknowledgment numbers for the sampled plurality of packets. The operations may include estimating a respective time for an unrecorded sequence number based on interpolation of the recorded sequence numbers for the sampled plurality of packets.

In some implementations, generating the estimated performance characteristic for the TCP connection includes determining a slope of acknowledgment numbers over the period of time based on the acknowledgment numbers recorded for the sampled plurality of packets transferred from the destination endpoint to the source endpoint through the middlebox and generating a throughput based on the slope of acknowledgment numbers where the throughput corresponds to a rate of packet transfer from the source endpoint to the destination endpoint through the middlebox. In other implementations, generating the estimated performance characteristic for the TCP connection includes determining a slope of acknowledgment numbers over time based on the acknowledgment numbers recorded for the sampled plurality of packets transferred from the source endpoint to the destination endpoint through the middlebox and generating a throughput based on the slope of the acknowledgment numbers where the throughput corresponds to a rate of packet transfer from the destination endpoint to the source endpoint through the middlebox.

In some examples, the operations include, at a given instance in time, receiving a first packet communicated over the TCP connection from the source endpoint, the first packet including a first sequence number and a first acknowledgment number and receiving a second packet communicated over the TCP connection from the destination endpoint, the second packet including a second sequence number and a second acknowledgment number. Here, the operations also include estimating a respective window size for the source endpoint by determining a difference between the first sequence number associated with the first packet and the second acknowledgment number associated with the second packet. In these examples, the operations may further include estimating a respective window size for the destination endpoint by determining a difference between the second sequence number associated with the second packet and the first acknowledgment number associated with the first packet.

In some implementations, sparsely sampling the plurality of packets includes sampling less than all packets from the TCP connection between the source endpoint and the destination endpoint. Additionally or alternatively, sparsely sampling the plurality of packets may include uniformly sampling packets from the TCP connection in a stateless and systematic manner. The source endpoint may be a user equipment (UE) communicating with a remote distributed network and the destination endpoint corresponds to a server in communication with the remote distributed network.

Another aspect of the disclosure provides a method for a trip time estimation for transport control protocol. The method includes sparsely sampling, at data processing hardware of a middlebox, a plurality of packets from one or more transport control protocol (TCP) connections between endpoints communicating through the middlebox over a period of time. For each packet of the sampled plurality of packets, the method includes generating, by the data processing hardware, a time stamp when the packet is sampled. The method includes determining, by the data processing hardware, that a first sequence number for a first sampled packet of the sampled plurality of packets transferred between the middlebox and a respective endpoint fails to match any acknowledgment numbers of the sampled plurality of packets. The method also includes estimating, by the data processing hardware, a respective time for an acknowledgment number that matches the first sequence number based on interpolation of a plurality of acknowledgment numbers for the sampled plurality of packets. The method further includes determining, by the data processing hardware, a trip time between the middlebox and the respective endpoint by a difference between a first time stamp associated with the first packet and the estimated respective time.

This aspect may include one or more of the following optional features. In some examples, sparsely sampling the plurality of packets includes sampling less than all packets front the TCP connection between the endpoints through the middlebox. Optionally, sparsely sampling the plurality of packets may include uniformly sampling packets from the TCP connection in a stateless and systematic manner. The endpoints may include a user equipment (UE) communicating with a remote distributed network as a source endpoint and a server in communication with the remote distributed network as a destination endpoint.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
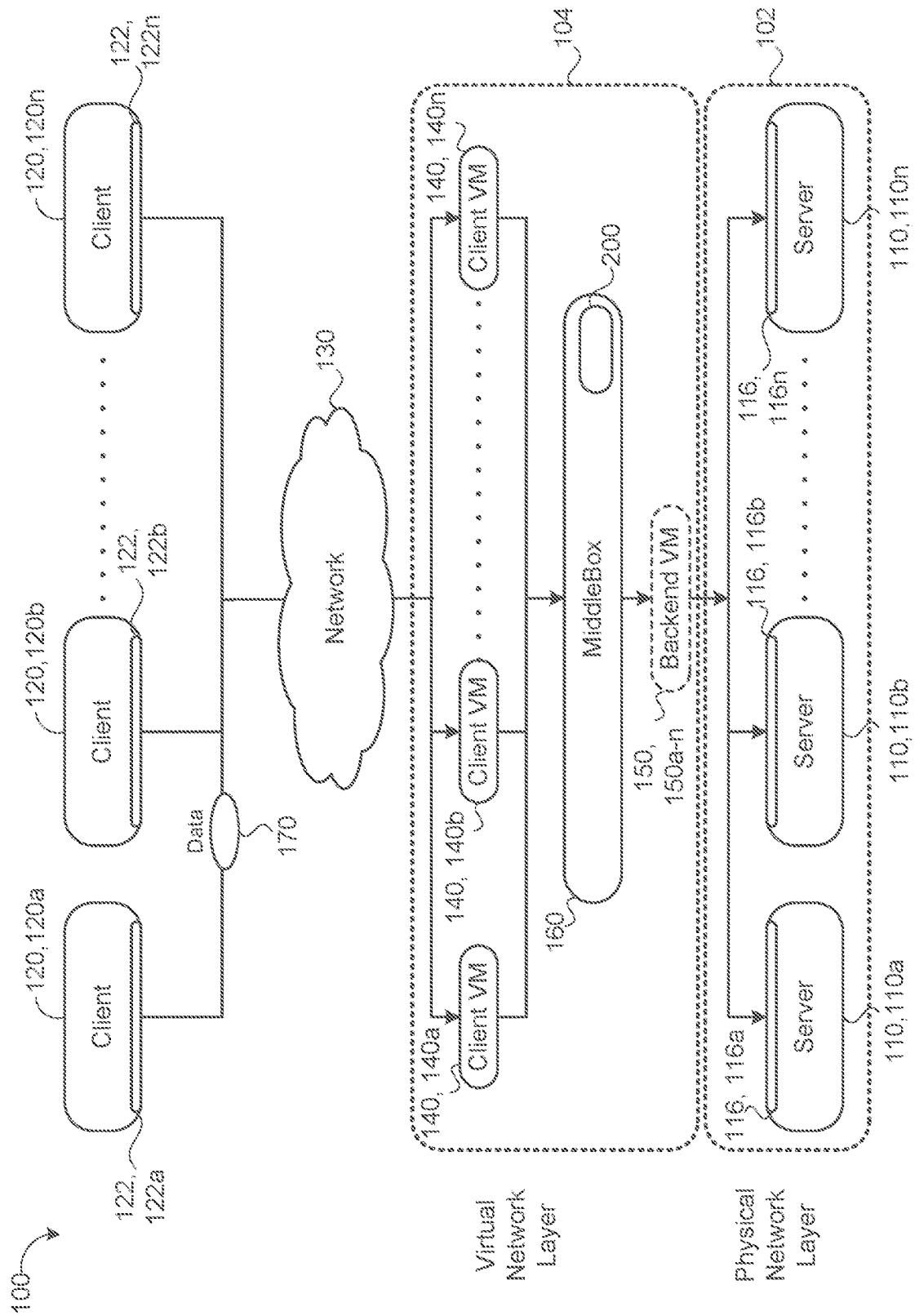
FIGS. 1A-1C are schematic views of example communication networks implementing transport control protocol (TCP) connections.

Transport control protocol/Internet protocol (TCP/IP) suit is predominantly used in network communications. The TCP/IP protocol suit was originally designed based on end-to-cud communication. For example, a source endpoint, such as a user, communicates with a destination endpoint, such as a server. This end-to-end design generally assumed that gateway nodes (i.e., routers), configured to communicate between two separate networks, would forward data packets of a TCP/IP packet stream to the destination endpoint (e.g., directly or by means of bops between intermediary destinations). Based on this assumption, routers would not need to modify a packet (e.g, by modifying a header or a payload) during transmission of the packet. Yet today, nodes within, and/or connecting between, networks have become more complex as network communication has evolved. In other words, networks deploy hardware and/or software as nodes within a network environment to perform network functions (i.e., network services) other than routing packets. For instance, these network functions include firewalls for network protection, network address translation (NAT), load balancing, virtual private network (VPN) tunneling, etc. In order to perform these network functions, network administrators and/or network providers have implemented middleboxes.

Unfortunately, middleboxes may disrupt the general end-to-end design for packets transmitted using TCP (i.e., transmitted by a TCP connection). For example, some middleboxes are configured to examine and/or to modify packets to perform network functions. Furthermore, middleboxes often receive packets from many TCP connections multiplexed through the middlebox and typically operate at the internet protocol (IP) layer. By operating on the IP layer, middleboxes do not employ TCP flow markers such as, for example, start or end of flow markers or acknowledgements. In other words, middlebox activity fails to provide the same or similar indicators of packet flow performance as a TCP flow (e.g., an end-to-end TCP connection). Without indicators of packet flow performance, it is difficult for network administrators or network services to evaluate and/or to improve network communication.

Determining connection characteristics (such as round trip time, throughput, window size, etc.) for TCP connections is important and useful when helping to configure, improve, and/or optimize communication in a network environment. In other words, the performance of a TCP connection may impact how effectively entities can communicate with each other and whether certain services may actually be provided across the TCP connection (e.g., streaming audio/video at a target quality level). In some scenarios, connection characteristics are determined, or estimated, at one or both ends of the TCP connection, (i.e., at one or both flow endpoints such as the source endpoint and the destination endpoint). However, this often requires custom-made functionality at those flow endpoints where custom-made functionality may not always be possible, such as when an endpoint has minimal processing functionality. For instance, certain internet-of-things (IOT) devices (such as home/domestic appliances; have low power or low processing capabilities. In some examples, determining and/or estimating the performance of a connection (e.g., a connection of two endpoints communicating via a middlebox) further burdens the connection itself. In other words, it is important that a system determines connection characteristics without adversely impacting the connection. Otherwise, not only would the determined/estimated connection characteristics not be indicative of, or an accurate measurement of the actual connection characteristic that should be achieved (thereby leading to ill-informed system configuration), but a system that burdens the connection while determining connection characteristics may reduce throughput and/or cause detriment to ail parties involved the communication.

To address these problems, implementations of the present disclosure are directed toward a system that generates TCP connection characteristics, or an estimate of TCP connection characteristics, at the middlebox associated with the TCP connection to result in minimal impact on the connection itself as well as the entities involved in the connection. Moreover, as the middlebox only samples TCP packets/segments (e.g. a small fraction of TCP packets/segments communicated via the TCP connection) in order to generate the estimates, the processing overhead for the middlebox is relatively small while having a minimal (or unnoticeable) impact on the performance of the TCP connection. Accordingly, the performance of other network connections managed by the middlebox remain unaffected.

Figure 1B:
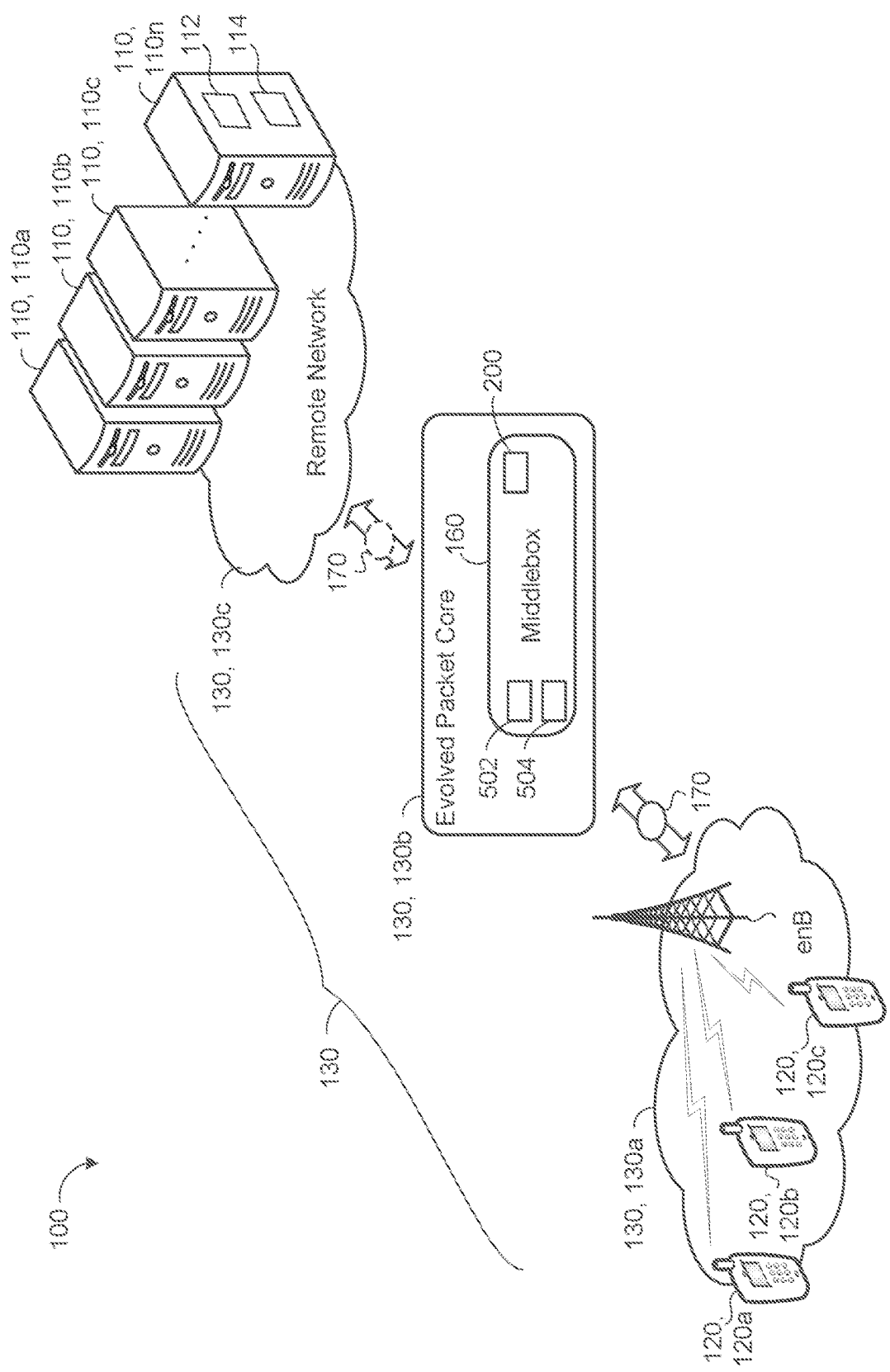
Figure 1C:
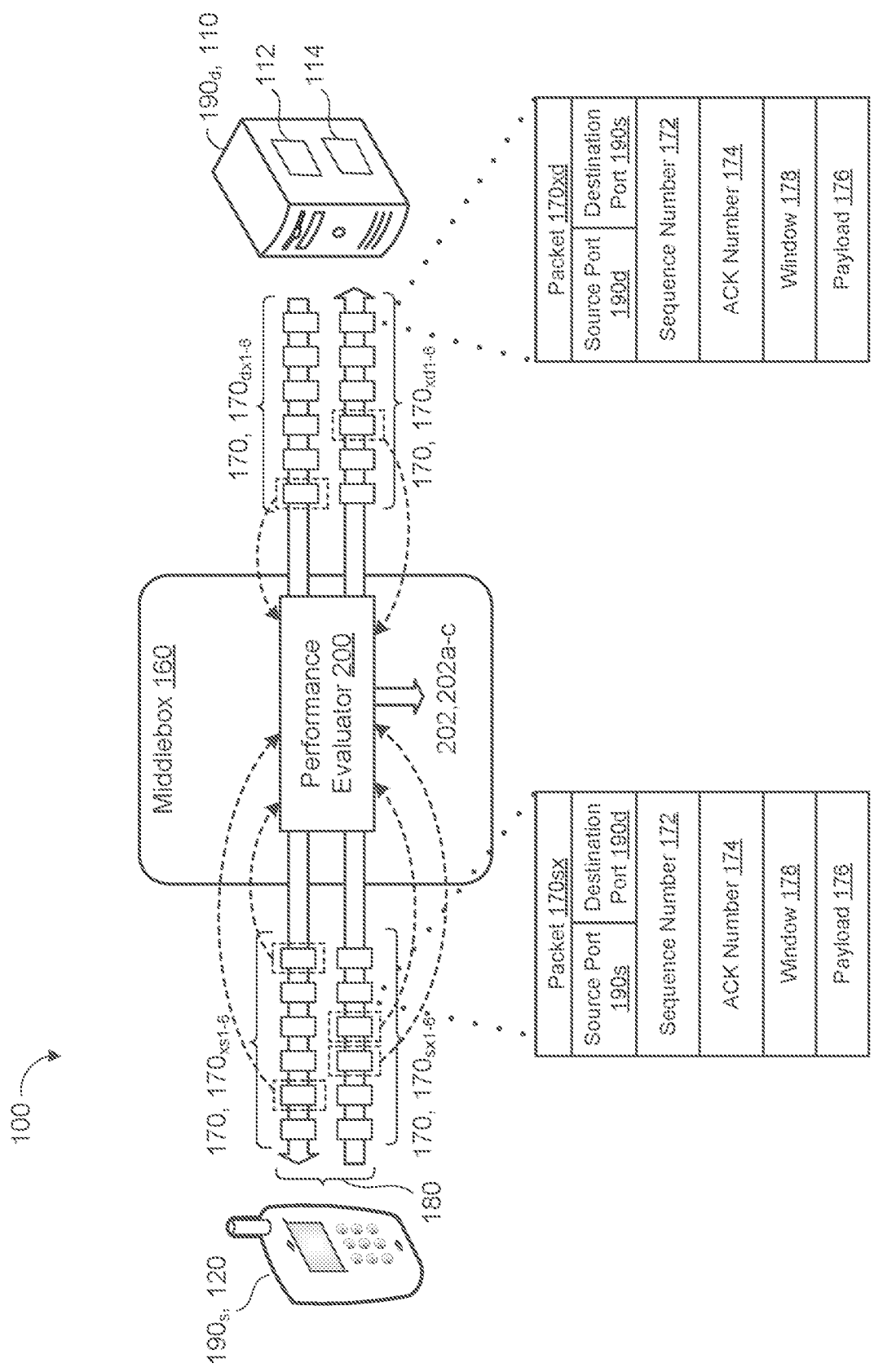

Referring to FIGS. 1A and 1B, in some implementations, a networking environment 100 is a distributed system (e.g., a remote network such as a cloud environment) having loosely coupled computing resources 110, 110a-n. The computing resources 110 may also be referred to as servers 110. These computing resources 110 may include data processing hardware 112 (e.g., one or more central processing units (CPUs) as shown in FIGS. 1B and 1C) and/or memory hardware 114 (e.g., flash memory, random access memory (RAM), phase change memory (PCM), and/or discs as shown in FIGS. 1B and 1C) accessible to one or more clients 120, 120a-n. For example, the computing resources 110 are shown as a plurality of servers. The clients 120 may communicate with computing resources 110 hosted on a physical network layer 102 through a network 130. For instance, the clients 120 and the servers 110 represent a collection of machines (e.g., hosts) forming endpoints of a physical network.

There may be many different types of networks 130 ranging from private networks and enterprise networks to public networks. Some more specific examples of networks include personal area networks (PAN), local area networks (LAN), wireless local area networks (WLAN), wide area networks (WAN), storage/system area networks (SAN), passive optical networks (PON), enterprise private networks (EPN), virtual private networks (VPN), radio access networks (RAN), packet core networks, etc. In some configurations, clients 120 and end hosts (i.e., hosts of the computing resources 110) may access (i.e., connect to) the network 130 via hardware such as network interface controllers (NICs) (also known as a network interface card, network adapter, or LAN adapter) or, in the case of an optical network, synchronous transport modules (STMs). For example, FIG. 1A depicts each client 120 with at least one NIC 122, 122a-n and each server 110 with at least one NIC 116, 116a-n.

Referring to FIG. 1A, in some examples, a network 130 includes a physical network layer 102 and a virtual network layer 104 that may be overlain on the physical network layer 102 to form a virtual network (also known as an overlay network) with its own internet protocol (IP) address space. The virtual network layer 104 enables the network 130 to be managed (e.g., by network administrators), designed, and/or deployed in a manner that may decouple network functionality from hardware appliances (e.g., proprietary hardware appliances). In other words, the virtual network layer 104 permits virtual network functionality (also referred to as network function virtualization) such that network services may operate by software to permit adaptability and scalability over a traditional networks with dedicated hardware. For instance, software-defined networking (SDN) of virtual networks removes the control plane from network hardware and implements the control plane instead in software. In some implementations, the virtual network layer 104 of the network 130 performs some network functionality virtually via software while performing other network functions with dedicated hardware in a hybrid virtualization approach. Virtual and/or hybrid approaches may allow flexibility and/or optimization for network providers or network administrators with respect to network space, power, size, scalability, deployment time, and/or repair and maintenance. For example, a virtual network layer 104 is dynamically configured to permit underlying changes to the physical network layer 102 without disrupting network services.

The virtual network layer 104 may be configured to perform a variety of network functions and/or mirror traditional network functions of physical networks. Some examples of these network functions include routing, network address translation (NATs), load balancing (LBs), security (e.g., firewalls and intrusion detection/prevention systems), protocol converting, wide area network optimization, proxies, caching, etc. In other words, virtual network functionality may be applicable to any data plane processing or control plane function within the network 130. Moreover, FIG. 1A illustrates the physical network layer 102 and the virtual network layer 104 in dotted lines to indicate that some or all functionalities of these layers 102, 104 may be physical and/or virtual. For instance, components shown within the virtual network layer 104, such as client virtual machines 140, the middlebox 160, and/or backend virtual machines 150 may be implemented as dedicated physical hardware (i.e., a physical layer) rather than operating on the virtual network layer 104. Depending on the network 130 and/or services provided by the network 130, there may be various advantages for different types of physical and virtual layer configurations.

With continued reference to FIGS. 1A and 1B, the network environment 100 includes various endpoints. These endpoints may refer to physical endpoints (e.g., that exist on the physical network layer 102) or virtual endpoints (e.g., that exist on the virtual network layer 104). For instance, as shown by FIGS. 1A-1C, clients 110 and/or servers 120 may be physical endpoints that communicate between each other by ways of network addresses. In other words, the client 110 may be a source endpoint while the server 120 is a destination endpoint (or vice versa). Data 170 in the form of packets (also referred to as data packets 170 or packets 170) may be communicated between endpoints based on assigned network addresses.

In some examples, the network environment 100 includes virtual network endpoints. Here, FIG. 1A depicts the virtual network endpoints as virtual machines (VMs), such as client virtual machines (client VMs) 140, 140a-n and backend virtual machines (backend VMs) 150, 150a-n. A virtual machine (VM) generally refers to an emulation or image of one or more host computer systems that enable a user to experience functionality of the host computer system without an ability to disturb an underlying operating system of a corresponding host computer system. VMs may be created to perform specialized tasks within one or more host environments. In some examples, the virtual network layer 104 allows multiple VMs to exist within a host computer system simultaneously. In order to allow multiple VMs to operate at once, the VMs are often sandboxed from the critical operating system resources of the host computer system VMs may be advantageous to virtual network layers 104 because they may be designed to map to (e.g., access) one or more computing resources 110 of the physical network layer 102 via a backend VM 150. For example, one or more client VMs 140 map to one or more backend VMs 150 where each backend VM 150 is a VM associated with computing resources 110 of a physical net work layer 102 (e.g., a distributed system). By mapping to particular computing resources 110, the client VM 140, in conjunction with the backend VM 150, may be designed for particular network services (e.g., network applications). In some configurations, backend VMs 150 operate as host-based VMs where data may be contained on servers of the physical network layer 102 and accessible by or allocated to a variety of remote clients 120. For instance, the virtual network layer 104 with VMs permits a centrally managed networked structure. Although network virtualization is generally described with respect to VMs, network virtualization (e.g., with a virtual network layer 104) can be generalized to connect other types of network endpoints, including virtual private networks (VPNs), bare metal servers, proxies, etc. For example, the networking environment 100 supports VPN gateways as a client which forwards requests from a customer's premises. Accordingly, in some examples, a VM is more generally a network endpoint to accommodate for other types of network connections.

In some implementations, in order to perform network functions, the network environment 100 includes at least one middlebox 160. As shown in FIG. 1A, the middle box 160 may include corresponding data processing hardware 502 and memory hardware 504 that stores instructions executable on the data processing hardware 502 for performing operations (e.g, executing methods 300, 400 of FIGS. 3 and 4). The middlebox 160 may be physical hardware (e.g., a dedicated appliance on the physical network layer 102) or software configured to perform the network functions (e.g., as shown in FIG. 1A). A middlebox 160 generally refers to any intermediary device that performs functions other than normal, standard functions of an internet protocol (IP) router on a datagram path between a source endpoint/host (e.g., a client via a client VM 140) and a destination endpoint/host (e.g., servers of the physical network layer 102 via a backend VM 150). In other words, the middlebox 160 is usually responsible for network functionality other than packet routing (e.g., network address translation (NATs), network address port translation (NAPT), load balancing (LBs), firewalls, intrusion detection/prevention systems, protocol converting, proxies, etc.). Although a middlebox 160 is typically responsible for network functionality other than routing, the middlebox 160 may be part of a device that also handles routing such that a networking environment 100 includes a single device supporting both routing and middlebox functions.

Within the networking environment 100, the middlebox 160 receives network flow from one or more clients 120 to perform network functions. Network connections with middlebox(es) 160 may be established based on connection requests from a client 120. In other words, connections may be negotiated between a client 120 and a backend (i.e., server 110) such that the middlebox 160 sits in the middle, processing and potentially modifying packets belonging to a connection. Once connections have been established with the middlebox 160 (e.g., forming a virtual connection between the client VM 140 and the backend VM 150), the middlebox 160 receives network traffic (e.g., packets 170 of data) based on the configured network functionality of the middlebox 160.

In some examples, the middlebox 160 performs NAT or NAPT on packets between the client 120 and the backend (e.g., backend VM). In the case of NAPT, the middlebox 160 tracks each connection and port mappings assigned to each connection. In other examples, the middlebox 160 is a layer-4 load balancer middlebox that forwards packets between the client 120 and the backend while also potentially tracking connections to ensure that future packets belonging to a connection continue to connect to the same backend. Alternatively, the middlebox 160 may be a layer-7 (i.e., application layer) load balancer where a client 120 establishes a transmission control protocol (TCP) with the middlebox 160 and the middlebox 160 establishes a separate connection with a backend (i.e., on behalf of the client 120). For a layer-7 load balancer, the transport protocol state (e.g., TCP sequence numbers and window sizes) would transfer from the middlebox 160 to a respective end host(s).

As previously mentioned, in some implementations, an overlay network, such as a virtual network layer 104, is not required to perform middlebox functions. For example, in a network, such as a physical Ethernet network, software running on an end host could direct a connection to a middlebox 160 by setting the destination media) access control (MAC) address to a MAC address corresponding to the middlebox 160. Here, to offload the connection, the host would set the MAC address to the address of the destination (or the address of an appropriate gateway to reach the destination). In other words, the middlebox 160 may communicate with physical machines instead of VMs. For instance, in load balancing, clients 120 and servers 110 need not be VMs on a virtual network layer 104, but rather connections between physical machines.

Middlebox(es) 160 may differ from routers in the respect that middlebox(es) 160 often perform stateful network functions. More specifically, stateful network functions refer to network functions that track an operating state and/or characteristic of network connections associated with the network function. For example, the middlebox 160 tracks connections such that the middlebox 160 is connection-aware, inspects packet context (e.g., periodically inspects payloads), and/or associates new connections with existing connections. By performing stateful functions, middlebox(es) 160 include a greater degree of data granularity to identify and/or recall connection events or connection data associated with previous sessions of a client 120 or a VM. These stateful functions may offer the layers 102, 104 security and performance benefits that may help stabilize network services.

Referring to FIG. 1B, in some implementations, the network environment 100 includes more than one type of network 130, 130a-c in communication with each other. Here, the clients 120 are depicted as user equipment (UEs) associated with a RAN 130, 130a. The RAN 130a includes three UEs 120a-c communicating with a base station (e.g., an evolved Node B (eNB)). In this example, the eNB interfaces with an evolved packet core (EPC) network 130, 130b that includes a middlebox 160. The EPC 130b may, in turn, communicate with an external network, such as the remote network 130, 130c (e.g., a distributed system or a cloud environment). The remote network 130c includes servers 110a-n that are configured to store and to communicate packets 170 of data to and from the clients 120a-c across the networks 130a-c.

FIG. 1C illustrates a simplified network environment 100 to show a network connection 180 between two endpoints 100. The network connection 180 travels through the middlebox 160 such that packets 170 flow from a source endpoint $190_s$ to the middlebox 160 (e.g., shown as packets 170, $170_{sx1-6}$) and from the middlebox 160 to a destination endpoint $190_d$ (e.g., shown as packets 170, $170_{xd1-6}$). With the network connection 180, packets 170 may also flow in the opposite direction from the destination endpoint $190_d$ (e.g., shown as the server 110) to the source endpoint $190_s$ (e.g., shown as the client 120). For instance, FIG. 1C depicts packets flowing from the destination endpoint $190_d$ to the middlebox 160 (e.g., shown as packets 170, $170_{dx1-6}$) and from the middlebox 160 to the source endpoint $190_s$ (e.g., shown as packets 170, $170_{xs1-6}$. Here, the subscript for the packets 170 identify the direction of travel for the packets 170. "D" refers to the destination endpoint $190_d$. "X" refers to the middlebox 160. "S" refers to the source endpoint $190_s$. In other words, "DX" corresponds to a packet 170 traveling from a destination endpoint $190_d$ to the middlebox 160 and "XS" corresponds to a packet 170 traveling from the middlebox 160 to the source endpoint $190_s$.

In order to transport packets 170 between the source endpoint $190_s$ to the destination endpoint $190_d$, the connection 180 uses a transmission control protocol (TCP). For example, the connection 180 is referred to as a TCP connection 180, TCP is a host-to-host protocol for packet-switched communication networks 130. TCP generally interfaces between a user, or an application process, and an internet protocol (IP). TCP is configured to transfer a continuous stream of bytes (i.e., octets) between endpoints 190 (e.g., a source and a destination) by packaging some number of bytes into segments (also known as packets 170) for transmission. When there is a TCP connection 180, TCP is configured to transmit two byte streams (or packet streams) one in each direction (e.g., (1) from the source endpoint $190_s$ to the destination endpoint $190_d$ and (2) from the destination endpoint $190_d$ to the source endpoint $190_s$).

TCP also includes a particular structure for a given packet 170 (e.g., shown in FIG. 1C). The structure of the packet 170 may ensure reliability of data (i.e., a payload of the packet 170) and also communicate characteristics about the TCP connection 180. In order to ensure reliability for data that is damaged, lost, duplicated, or delivered out of order, TCP assigns a sequence number 172 to each byte transmitted and requires a positive acknowledgment (ACK) front the destination port (e.g., cure of the endpoints 190 depending, on the direction that the packets 170 are being transmitted). In some examples, the ACK is its own packet 170 while in other examples, acknowledgment occurs in the form of an acknowledgment number 174. In yet other examples, the ACK includes both its own ACK packet 170 as well as acknowledgment number 174 when the acknowledging endpoint (e.g., designated by the destination port) transmits data to the original source endpoint $190_s$ (e.g., designated by the source port). When an ACK is not received within a timeout interval, TCP will retransmit the data (e.g., packet(s) 170). The destination (e.g., one of the endpoints 190 depending on the direction that the packets 170 are being transmitted)) may use the sequence number 172 to reorder the packets 170 or to eliminate duplicates when necessary. In addition to reliability, TCP allows the destination to dictate an amount of flow that may be received. In some examples, the destination communicates a window 178 with each ACK to indicate a range of acceptable sequence numbers 172 after the last successfully received packet 170 that the receiver is willing to receive. The window 178 refers to an acceptable bandwidth of data (i.e., bytes) to transfer to the destination at any one time.

In order to establish a TCP connection 180 between the source endpoint $190_s$ and the destination endpoint $190_d$, the endpoints 190 initially undergo a three-way handshake. In the first step of the three-way handshake, the source endpoint $190_s$ (e.g, shown as the client 120) wants to establish a connection 180 with the destination endpoint $190_d$ (e.g., shown as the server 110). Here, the source endpoint $190_s$ sends a packet 170 with a synchronized sequence number (SYN) to inform the destination endpoint $190_d$ that the source endpoint $190_s$ intends to start communication with destination endpoint $190_d$ and which sequence number the source endpoint $190_s$ intends to begin with. At step two of the three-way handshake, the destination endpoint $190_d$ (e.g., the server 110) responds with a SYN and an ACK. The destination endpoint $190_d$ uses the ACK to acknowledge the packet 170 sent from the source endpoint $190_s$ and uses the SYN to informs the source endpoint $190_d$ with what sequence number 172 it is likely to start packet transmission. At step three, the source endpoint $190_s$ acknowledges the response of the destination endpoint $190_d$. It is at this time that the TCP connection 180 is established between the source endpoint $190_s$ and the destination endpoint $190_d$.

Although the three-way handshake establishes a TCP connection 180 between endpoints 190, the functionality of the middlebox 160, as an intermediary device between these endpoints 190, disrupts traditional means to monitor the TCP performance between these connected endpoints 190. As previously mentioned, some middleboxes 160 inspect and/or modify packets 170 to perform network functions. When a packet 170 is modified, traditional techniques to monitor the TCP performance may not be able to rely on fields/attributes of the standard packet structure. Additionally or alternatively, middleboxes 160 often receive packets from many TCP connections 180 multiplexed through the middlebox and typically operate at the internet protocol (IP) layer. By operating on the IP layer, middleboxes do not employ TCP flow markers such as, for example, start or end of flow markers or acknowledgements. In other words, middlebox activity fails to provide the same or similar indicators of packet flow performance as a TCP flow (e.g., an end-to-end TCP connection). Without indicators of packet flow performance, it is difficult for network administrators or network services to evaluate and/or to improve network communication.

With continued reference to FIGS. 1A-1C, the network environment 100 further includes a performance evaluator 200 at or coupled to the middlebox 160. The performance evaluator 200 is configured to estimate a performance characteristic 202 (FIG. 1C) for a TCP connection 180 between endpoints 190. For instance, FIG. 1C shows the performance evaluator 200 estimating one or more performance characteristic 202, 202a-c for the TCP connection 180 between the client 120 and the server 110. Some examples of performance characteristics 202 include a trip time 202a (e.g., a round trip time RTT), a throughput 202b, and an estimated window size 202c. As shown in FIG. 1C, the performance evaluator 200 estimates the performance characteristic 202 by sampling packets 170 from the TCP connection 180. For example, in FIG. 1C, the performance evaluator 200 receives two packets $170_{xs2,6}$ traveling from the middlebox 160 to the source endpoint $190_s$, two packets $170_{xs2,6}$ traveling from the source endpoint $190_s$ to the middlebox 160, one packet $170_{dx1}$ from the destination endpoint $190_d$ to the middlebox 160, and one packet $170_{xd4}$ traveling from the middlebox 160 to the destination endpoint $190_d$. This illustrates that since the performance evaluator 200 is located and/or able to monitor packet 170 and/or packet activity at the middlebox 160, the performance evaluator 200 can monitor each segment of the bi-directional TCP connection 180 between endpoints 190.

In some implementations, once a TCP connection 180 has been established, each endpoint 190 (e.g., the source endpoint $190_s$ or the destination endpoint $190_d$) transfers bytes of data as packets 170. Because the TCP connection 180 allows each endpoint 190 to transfer data, each endpoint 190 has its own timeline (e.g., shown below each endpoint in FIG. 1D) with respect to sequence numbers 172 for packets 170 sent. In other words, the source endpoint $190_s$ will begin with an initial sequence number (ISN) 172 that will increment for each byte of data that the source endpoint $190_s$ transmits to the destination endpoint $190_d$. Similarly, the destination endpoint $190_d$ will begin at its own initial sequence number (ISN) 172 (e.g., most likely different from the ISN 172 of the source endpoint $190_s$) and increment its own initial sequence number 172 for each byte of data the destination endpoint $190_d$ communicates to the source endpoint $190_s$. Each of these sequence numbers 172 will be managed independently of each other such that bytes transferred from the source endpoint $190_s$ will not increment the sequence number for packets 170 transferred from the destination endpoint $190_d$ (or vice versa).

Figure 1D:
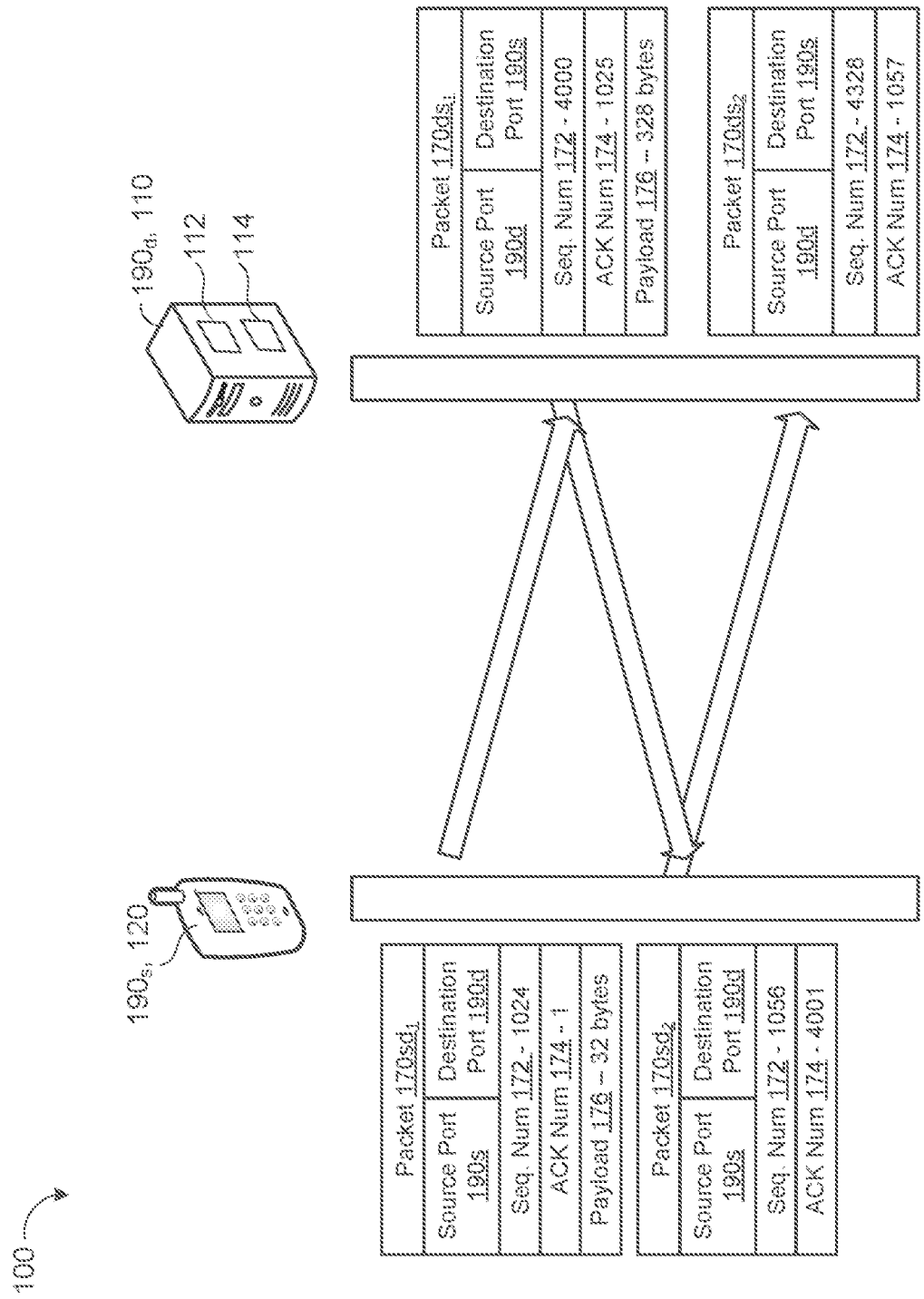
FIG. 1D is a schematic view of an example TCP connection between endpoints of a communication network.

Referring to FIG. 1D, the ISN 172 of the source endpoint $190_s$ is initialized at a sequence number 172 equal to 1024 (shown in packet $170_{sd1}$) while the ISN 172 of the destination endpoint $190_d$ begins at a sequence number 172 equal to 4000 (shown in packet $170_{sd1}$). When the source endpoint $190_s$ transfers 32 bytes of data to the destination endpoint $190_d$, its sequence number of 1024 is incremented by 32 bytes to 1056 (e.g., shown from the first packet $170_{sd1}$ to the second packet $170_{sd2}$) while the sequence number 172 of the destination endpoint $190_d$ remains at 4000 (e.g., even though 32 bytes have been transmitted with the TCP connection 180 from the source endpoint $190_s$) until the destination endpoint $190_d$ transmits its own data (i.e., bytes). For instance, the destination endpoint $190_d$ transmits 328 bytes to the source endpoint $190_s$ incrementing its sequence number 172 from 4000 to 4328 (e.g., shown from the first packet $170_{ds1}$ to the second packet $170_{ds2}$) while the sequence number 172 for the source endpoint $190_s$ remains at 1056. The incremented sequence number 172 will be visible ax the sequence number 172 in the subsequent packet 170 sent by an endpoint 190. For example, the first packet $170_{sd1}$ including 32 bytes of data sent by the source endpoint $190_s$ will have the ISN 172 equal to 1024 and the second packet $170_{sd2}$ sent by the source endpoint $190_s$ will have a subsequently incremented sequence number 172 equal to 1056 due to the 32 bytes of data previously sent by the source endpoint $190_s$ in the first packet $170_{sd1}$. The destination endpoint $190_d$ follows the same incrementing for its sequence number 172 per packet 170 (e.g., see the first packet $170_{ds1}$ and the second packet $170_{ds2}$). The payload 176 of a packet 170 generally refers to the bytes included in the packet 170. For instance, the first packet $170_{sd1}$ sent by the source endpoint $190_s$ includes a corresponding payload 176 equal to 32 bytes, while the first packet $170_{ds1}$ sent by the destination endpoint $190_d$ includes a corresponding payload 186 equal to 328 bytes. In some examples, a TCP packet 170 has a maximum number of bytes packaged for TCP. In other examples, a connection itself between endpoints 190 further limits the maximum number of bytes for a payload 176 due to the limitations/constraints with the connection 180.

As shown by the packet structure in FIGS. 1C and 1D, besides having a sequence number 172, a packet 170 may also include an acknowledgment (ACK) number 174. The ACK number 174 within a packet 170 indicates that a sender of the packet 170 has received sequence numbers 172 (e.g., from the opposite endpoint 190) prior to the ACK number 174 and anticipates to receive the next sequence number 172. For instance, although there may be some delay between endpoints 190 (e.g., other intermediary hops or delay within the TCP connection 180), when the destination endpoint $190_d$ receives the first packet $170_{sd1}$ from the source endpoint $190_s$ with 32 bytes, the next packet $170_{ds1}$ sent by the destination endpoint $190_d$ to the source endpoint $190_s$ acknowledges the receipt of the 32 bytes by including an ACK number 174 of the sequence number 172 of the first packet $170_{sd1}$ from the source endpoint $190_s$ (i.e., the sequence number 172 of 1024) incremented by 1 byte to indicate the next anticipated byte that the destination endpoint $190_d$ intends to receive from the source endpoint $190_s$. In other words, when the destination endpoint $190_d$ receives the 32 bytes from the first packet $170_{sd1}$ with a sequence number 172 equal to 1024, the ACK number 174 for the next immediate packet $170_{ds1}$ communicated from the destination endpoint $190_d$ will be equal to 1025 (i.e., sequence number 1024 has been received and the destination endpoint $190_d$ intends to next receive 1025).

Referring to FIGS. 2A-2D, the performance evaluator 200 includes a sampler 210 and an estimator 220. The sampler 210 is configured to sample a plurality of packets 170 from the TCP connection 180 between endpoints 190 (e.g., the source endpoint $190_s$ and the destination endpoint $190_d$). For example, FIG. 1C depicts packets 170 that the sampler 210 samples with dotted boxes that feed into the performance evaluator 200. Here, by sampling from a packet stream of the TCP connection 180, the performance evaluator 200 may reduce the burden (e.g., processor and/or resource cost) on middlebox 160 or TCP connection 180. For example, the performance evaluator 200 could evaluate each and every packet 170 or a substantial majority of packets 170 flowing through the middlebox 160 for a given TCP connection 180. This approach would be accurate, but nonetheless impose a significant tax on resources of the middlebox 160 (e.g., by measurement building a full TCP proxy for each flow (i.e., connection 180) at the middlebox 160). In other words, this approach would attempt to recreate a TCP endpoint for each flow at the middlebox 160. Furthermore, besides being a tax on resources of the middlebox 160, this approach would introduce additional latency for the client 120 because of window sizes at the proxy. Any additional latency may result in a diminished user experience, especially when these TCP connections 180 affect media transmissions (e.g., audio, video or both in real-time communication). This sampling may become increasingly important as a number of clients and/or hosts increases in size and the middlebox 160 proportionally receives an increase in network flow and connections that demands greater programming resources to program and/or to manage activity at a middlebox 160, particularly in functions performed by a middlebox 160 with stateful tracking (e.g., connection tables). For example, there may be millions of packets flowing through a middlebox 160. In these instances, the middlebox 160, as an intermediary device, may add latency, a bottleneck, and an additional hop for the network functions between endpoints 190.

Figure 2A:
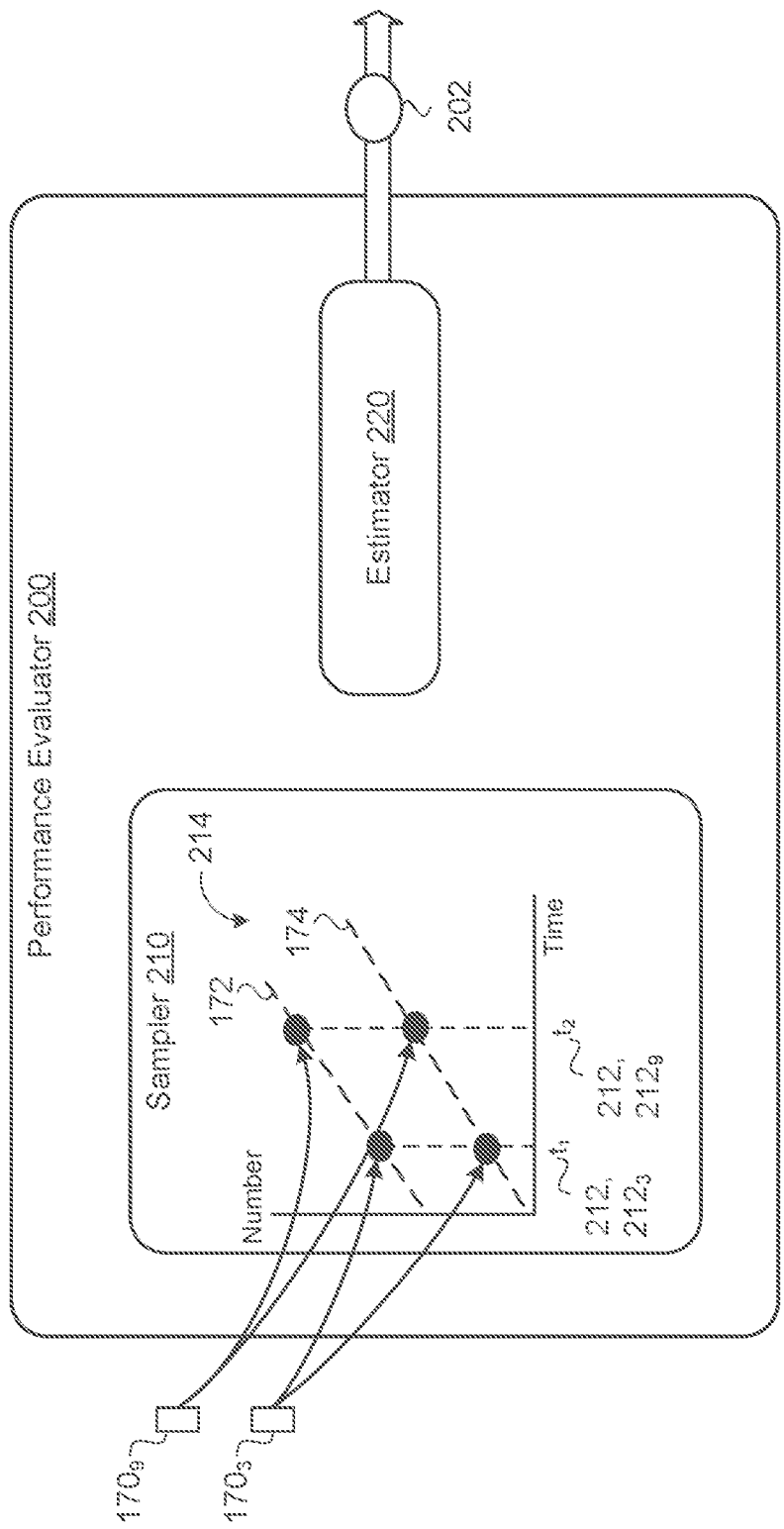
FIGS. 2A-2E are schematic views of examples of a performance evaluator for a middlebox of a communication network.

In some examples, for each packet 170 that the sampler 210 samples, the sampler 210 generates a time stamp 212 for the sampled packet 170 when the packet 170 is sampled at the middlebox 160. In other words, the time stamp 212 corresponds to a time t when the middlebox 160 encounters the packet 170. In some implementations, the sampler 210 records a sequence number 172 and/or an acknowledgment number 174 along with the time stamp 212 for each sampled packet 170. The sampler 210 may also be configured to record and/or to store other fields or attributes of a packet 170 (e.g., packet header information, payload size, flags, checksum, etc.). When a sampled packet 170 fails to include an attribute that the sampler 210 is configured to record, the sampler 210 may flag this occurrence and/or continue processing (e.g., recording other packet attributes and/or generating time stamps 212) the packet 170. For example, a packet 170 fails to include an acknowledgment number 174. The sampler 210 may be configured to log and/or to store the recordation of the sequence numbers 172, the acknowledgment numbers 174, the time stamps 212, and any other packet attribute for the sampled packets 170. Additionally or alternatively, the sampler 210 generates a plot 214 or a trend line for each recorded sequence number 172 and/or acknowledgment number 174 at its respective time stamp 212. In other words, the sampler 210 may plot these numbers 172, 174 with respect to time. By generating a plot 214 or a trend line, the sampler 210 may streamline estimation of the performance characteristic 202 by the performance evaluator 200 or allow various network entities (such as network users, network administrators, etc.) to have visibility regarding performance of the TCP connection 180 over time. As shown in FIG. 2A, the sampler 210 may plot these recorded numbers 172, 174 together in the same plot 214 or individually (not shown). FIG. 2A depicts the sampler 210 with a plot 214 of numbers 172, 174 with respect to time t to be illustrative of the generation and/or recordation functionality of the sampler 210 even though the performance evaluator 200 does not require the sampler 210 to generate a plot 214 to estimate the one or more performance characteristics 202.

Referring specifically to FIG. 2A, the sampler 210 is shown receiving (i.e., sampling) two packets $170_{3,9}$. Here, the sampler 210 generates a first time stamp $212_3$ for the first sampled packet $170_3$ and a second time stamp $212_9$ for the second sampled packet $170_9$. In FIG. 2A, the sampler 210 generates the plot 214 as one possible means to record and/or to store the numbers 172, 174 associated with the two packets $170_{3,9}$. For instance, the sequence numbers 172 and acknowledgment numbers 174 are shown as points connected on individual trend lines. In some examples, the trend lines represent interpolation of known data points (e.g., recorded numbers 172, 174 and time stamps 212). Interpolation is often used in data sampling to generate a function (e.g., a slope of the trend line of FIG. 2A) representing the sampled data points such that the function may approximate or estimate values for unknown data points (e.g., unsampled data points). In some examples, based on interpolation of information (e.g., packet attributes) from the sampled packets 170, the performance evaluator 200 (e.g., at the estimator 220) estimates the performance characteristics 202. As an example, by using the trend line of the sequence number 174, the performance evaluator 200 estimates that a packet $170_6$ between the two packets $170_{3,9}$ would likely occur at a time stamp 212 associated with a midpoint between the sequence numbers 172 of the two packets $170_{3,9}$.

In some implementations, the sampler 210 sparsely samples the plurality of packets 170 from the TCP connection 180. Rather than evaluating all of the packets 170, sparsely sampling may help guarantee that minimal resources of the middlebox 160 are being consumed. In a general sense, sparsely sampling packets 170 from the TCP connection 180 means sampling less than all of the packets 170 communicated within the packet stream of the TCP connection 180. In some examples, sparsely sampling refers to not sampling a majority of the packets 170 communicated within the packet stream of the TCP connection 180. In some implementations, the sampler 210 is configured to sparsely sample packets 170 of the TCP connection 180 by sampling between one- to ten-percent (1% to 10%) of the packets 170 of the TCP connection 180. In other implementations, the sampler 210 is configured to sparsely sample packets 170 of the TCP connection 180 by sampling less than one-percent (e.g., 0.1%) of the packets 170 of the TCP connection 180. Regardless of the sparsity of the sampling, the sampling may occur at a systematic sampling frequency. The sampling may occur randomly or uniformly (e.g., systematically at some distinct interval). Here, the sampling by the sampler 210 may occur in a stateless manner. For instance, the sampler 210 does not account for an operating state and/or characteristics of the TCP connection 180 during sampling.

Figure 2B:
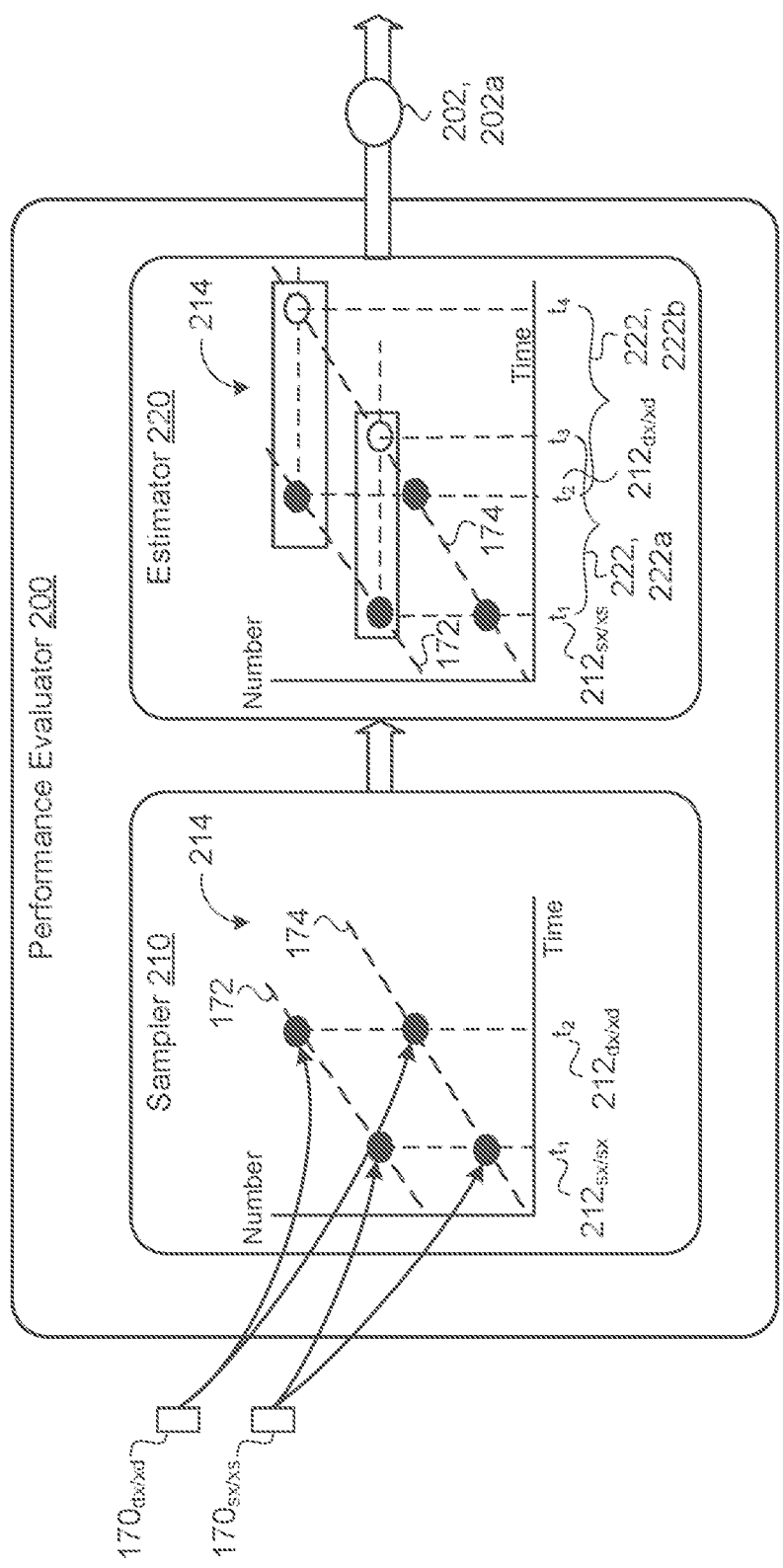
Figure 2C:
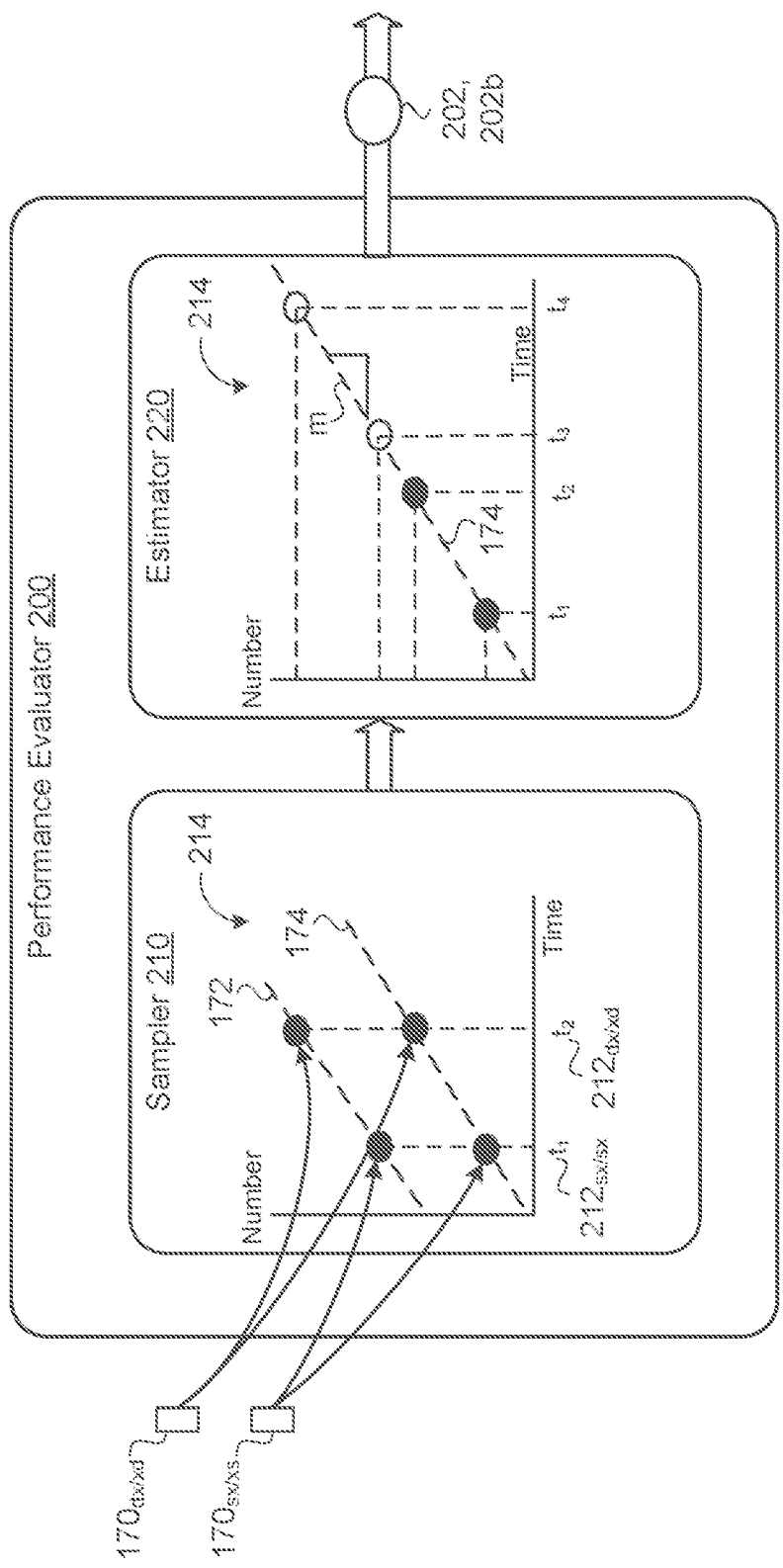
Figure 2D:
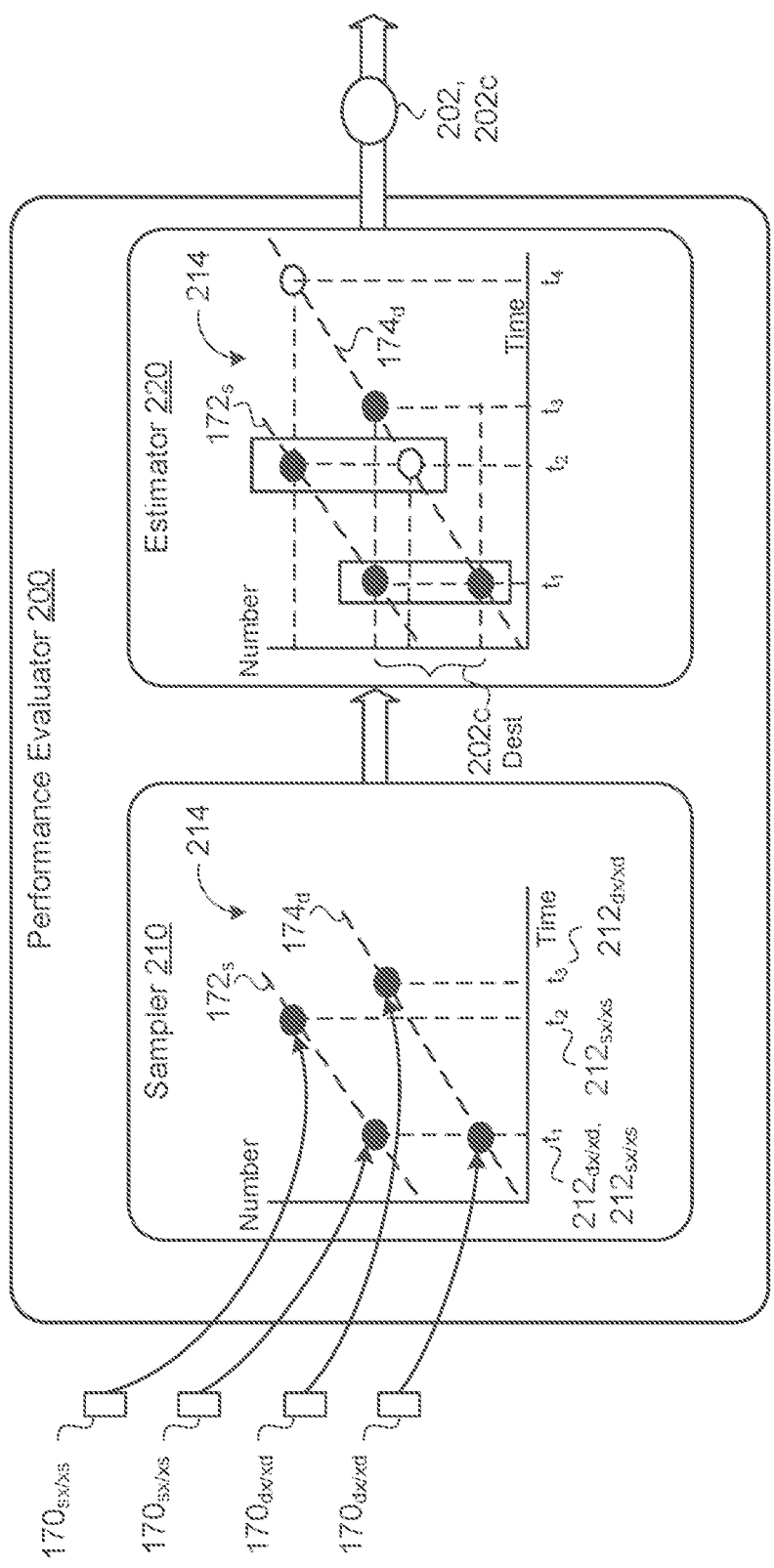
Figure 2E:
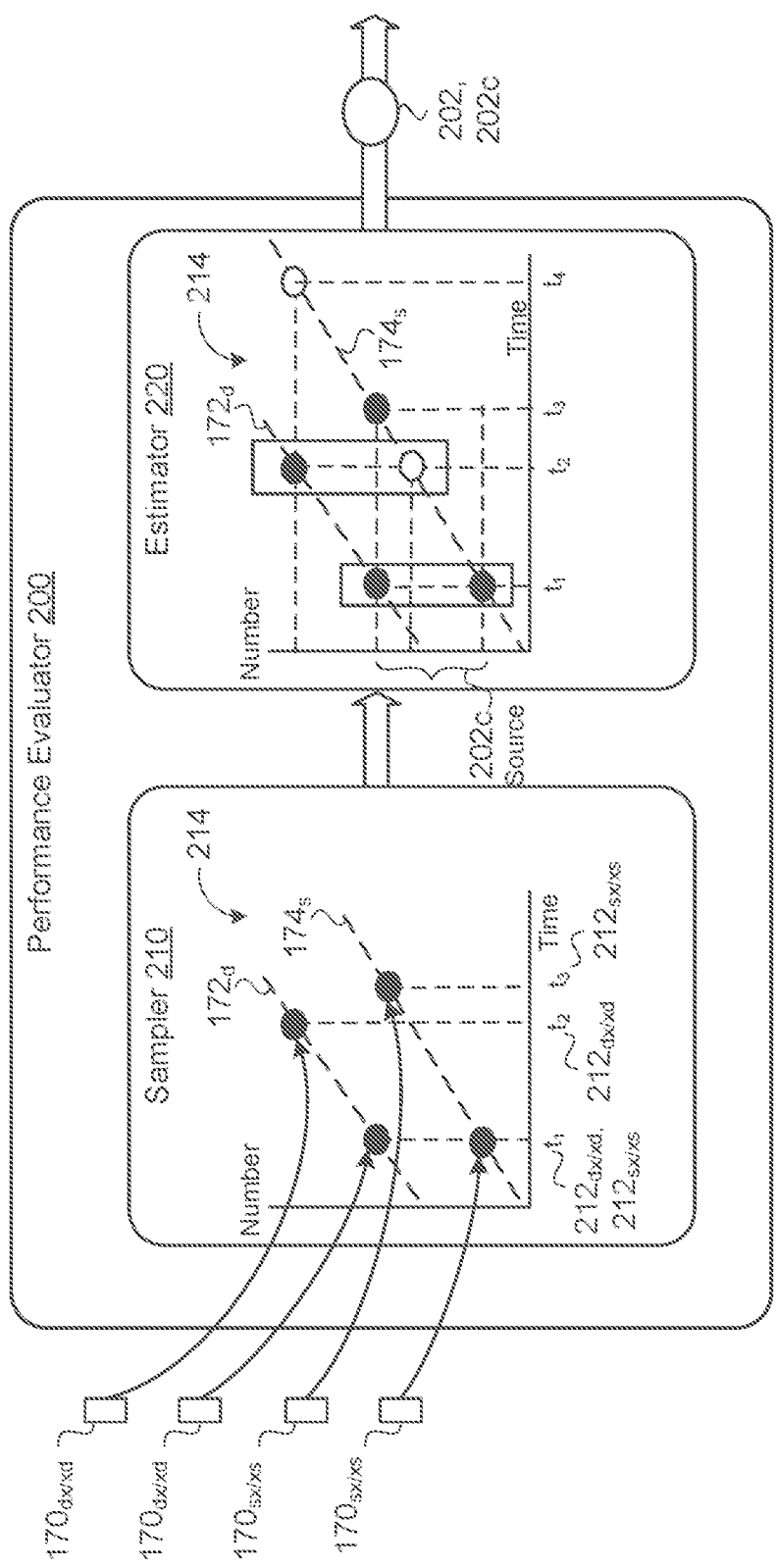

In some configurations, the estimator 220 is configured to generate the estimated performance characteristic 202 for the TCP connection 180 between the source endpoint $190_s$ and the destination endpoint $190_d$ through the middlebox 160 over the period of time based on at least two of a respective time stamp 212, a respective sequence number 172, or a respective acknowledgment number 174 from one or more of the sampled plurality of packets 170. The functionality of the estimator 220 may vary depending, on a type of performance characteristic 202 for the TCP connection 180 that the estimator 220 is estimating. FIG. 2B shows the estimator 220 determining the performance characteristic 202 corresponding to RTT 202a (or trip time 222). FIG. 2C illustrates the estimator 2220 determining the performance characteristic 202 corresponding to throughput 202b. FIGS. 2D and 2E depict the estimator 220 determining the performance characteristic 202 corresponding to estimated window size 202c for the destination endpoint $190_d$ and the source endpoint $190_s$, respectively.

Referring to FIG. 2B, in some examples, to estimate round trip time (RTT) 202a, the estimator 220 analyzes segments of the TCP connection 180 between endpoints 190. In other words, the RTT 202a includes: (i) a first trip time 222, 222a for a TCP connection segment between the source endpoint $190_s$ and the middlebox 160 (e.g., a device/client-side trip time); and (ii) a second trip time 222, 222b for a TCP connection segment between the destination endpoint $190_d$ and the middlebox 160 (e.g., a server/service-side trip time). In order to make an accurate estimation of the RTT 202a, the estimator 220 may perform a summation of the first trip time 222a and the second trip time 222b. Although it may be less accurate, the estimator 220 may estimate the RTT 202a based on a trip time 222 for either TCP connection segment and double this trip time 222 to form an estimation for the RTT 202a between endpoints 190 through the middlebox 160.

In some examples, for the trip time 222 (e.g., the first trip time 222a or the second trip time 222b), the estimator 220 identifies a sequence number 172 from a sampled packet 170 transferred by the TCP connection 180 within a given TCP connection segment. For example, FIG. 2B illustrates at least one sampled packet $170_{sx/xs}$ from the TCP connection segment between source endpoint $190_s$ and the middlebox 160 by the subscript "sx/xs," and at least one sampled packet $170_{dx/xd}$ from the TCP connection segment between destination endpoint $190_d$ and the middlebox 160 by the subscript "dx/xd," Based on the generated time stamps $212_{sx/xs}$, $212_{dx/xd}$ and the associated recorded numbers 172, 174 from the sampler 210, the estimator 220 determines at what time an acknowledgment number 174 that matches a sequence number 172 would be received in this TC connection segment (e.g., between source endpoint $190_s$ and the middlebox 160). In other words, a difference in time between when a sequence number 172 was communicated within a TCP connection segment (e.g., a time stamp 212 when the performance evaluator 200 recorded a sequence number 172) and when an acknowledgment number 174 identifying that sequence number 172 was acknowledged within the same TCP connection segment (e.g., a time stamp 212 when the performance evaluator records an acknowledgment number 174 matching the sequence number 172), corresponds to a trip time 222 for that TCP connection segment. This is true regardless of the TCP connection segment.

The estimator 220 may attempt to match either a known sequence number 172 that has been recorded by the sampler 210 or an estimated sequence number 172 based on interpolation of two or more known sequence numbers 172 recorded by the sampler 210. Since the sample 210 is not sampling all of the packets 170 communicated in the TCP connection 180 between the endpoints 190, the estimator 220 may not receive a recorded acknowledgment number 174 that matches a sequence number 172. When a recorded acknowledgment number 174 fails to match sequence number 172 identified by the estimator 220 for use in determining trip time 222, the estimator 220 is configured to estimate a respective time when a corresponding acknowledgment number 174 would match the identified sequence number 172 based on interpolation of the recorded acknowledgment numbers 174 for packets 170 sampled by the sampler 210. For example, FIG. 2B illustrates that an acknowledgment number 174 matching a recorded sequence number 172 from the sampler 210 is unknown by an open point on the acknowledgment trend line rather than a filled point on the acknowledgment trend line. Here, the estimator 220 determines respective times for the acknowledgment numbers 174 that match the sequence numbers 172 in order to determine both trip times 222a-b. The first trip time 222a is shown as a difference between an estimated matching acknowledgment time $t_3$ and a respective time stamp 212, $t_1$ for a recorded sequence number 172. Similarly, the second trip time 222a is shown as a difference between an estimated matching acknowledgment time $t_4$ and a respective time stamp 212, $t_2$ for a recorded sequence number 172. In some configurations, the estimator 220 assumes that the sampler 210 has not recorded a matching acknowledgment number 174 (e.g., due to infrequent or sparse sampling). In other words, the estimator 220 may not even be configured to try to identify a recorded acknowledgment number 174 that matches a sequence number 172.

Referring to FIG. 2C, the estimator 220 may determine the throughput 202b for either direction of the TCP connection 180 between endpoints 190 (e.g., from the source endpoint $190_s$ to the destination endpoint $190_d$ or from the destination endpoint $190_d$ to the source endpoint $190_s$). In either direction, the estimator 220 determines a slope "m" of acknowledgment numbers 174 over a period of time t based on recorded acknowledgment numbers 174. Since acknowledgment numbers 174 acknowledge received sequences of data from packets 170 by sequence number 172, the slope m of the acknowledgment numbers 174 corresponds to a rate at which packets 170 are being transferred or have been transferred to the endpoint 190 communicating the acknowledgment number 174. In other words, when the destination endpoint $190_d$ is communicating the acknowledgment numbers 174, the slope m corresponds to the rate at which the source endpoint $190_s$ is transferring packets 170 to the destination endpoint $190_d$. The opposite is also true that when the source endpoint $190_s$ is communicating the acknowledgment numbers 174, the slope m of these acknowledgment numbers 174 corresponds to the rate at which the destination endpoint $190_d$ is transferring packets 170 to the source endpoint $190_s$.

In some examples, such as FIG. 2D, instead of sending a single packet 170 at a time and waiting for a response (e.g., an acknowledgment packet 170), each endpoint 190 for a TCP connection 180 sends a set of packets 170 (called a window) to the other endpoint 190. Each side maintains its respective window. Each endpoint 190 may acknowledge a packet 170 or the window of packets 170 to minimize latency due to acknowledgment. Because a size of a window can impact a TCP connection 180, the performance evaluator 200 is configured to generate an estimated window size 202c for each endpoint 190 to help optimize the communication between endpoints 190. In some examples, the estimator 220 generates the estimated window size 202c by selecting a packet 170 that has been sampled by the sampler 210. Based on the sampled packets 170, the estimator 220 determines a difference between a recorded sequence number 172 and an acknowledgment number 174 (e.g., a recorded acknowledgment number 174 or an estimated acknowledgment number 174) at the same time stamp 212. When the acknowledgment number 174 is communicated by the destination endpoint $190_d$ (e.g., associated with a packet 170 sent by the destination endpoint $190_d$), for example in FIG. 2D, the estimated window size 202c by the estimator 220 will be an estimated window size 202c for the destination endpoint $190_d$. Conversely, when the acknowledgment number 174 is communicated by the source endpoint $190_s$ (e.g, associated with a packet 170 sent by the source endpoint $190_s$), for example in FIG. 2E, the estimated window size 202c by the estimator 220 will be an estimated window size for the source endpoint $190_s$. Regardless of which endpoint 190 the estimated window size 202c corresponds to, the estimator 220 generates the estimated window size 202c based on the determined difference between the recorded sequence number 172 and an acknowledgment number 174. In other words, the estimator 220 determines the estimated window size 202c by a difference of numbers 172, 174 at the same time stamp 212. For instance, FIG. 2D depicts blocks around numbers 172, 174 at the same time instance to illustrate the estimated window size 202c. In some implementations, each time the sampler 210 performs sampling of the TCP packet flow, the sampler 210 is configured to sample a packet 170 in each TCP. How direction (e.g., a pair of packets at the same time stamp 212) such that it is more efficient for the estimator 220 to generate the estimated window size 202c. In other implementations, the sampler 210 samples only one packet 170 from either TCP flow direction such that the estimator 220 interpolates sampled packets 170 to generate the estimated window size 202c.

FIGS. 2D and 2E depict different plots 214 that the sampler 210 and/or estimator 220 may generate to determine the estimated window size 202c. In FIG. 2D, the sampler 210 and/or estimator 220 generates a plot 214 that depicts the sequence numbers 172 from the source endpoint $190_s$ (e.g., shown as reference $172_s$ on the trend line in FIG. 2D) along with the acknowledgment number 174 from the destination endpoint $190_d$ (e.g., shown as reference $174_d$ on the trend line in FIG. 2D). In FIG. 2E, the sampler 210 and/or estimator 220 generates a plot 214 that depicts the sequence numbers 172 from the destination endpoint $190_d$ (e.g., shown as reference $172_d$ on the trend line in FIG. 2E) along with the acknowledgment number 174 from the source endpoint $190_s$ (e.g., shown as reference $174_s$ on the trend line in FIG. 2E). With either plot 214, the estimated window size 202c is equal to the distance between a point on the sequence number 172 trend line and a point on the acknowledgment number 174 trend line at the same time t.

Figure 3:
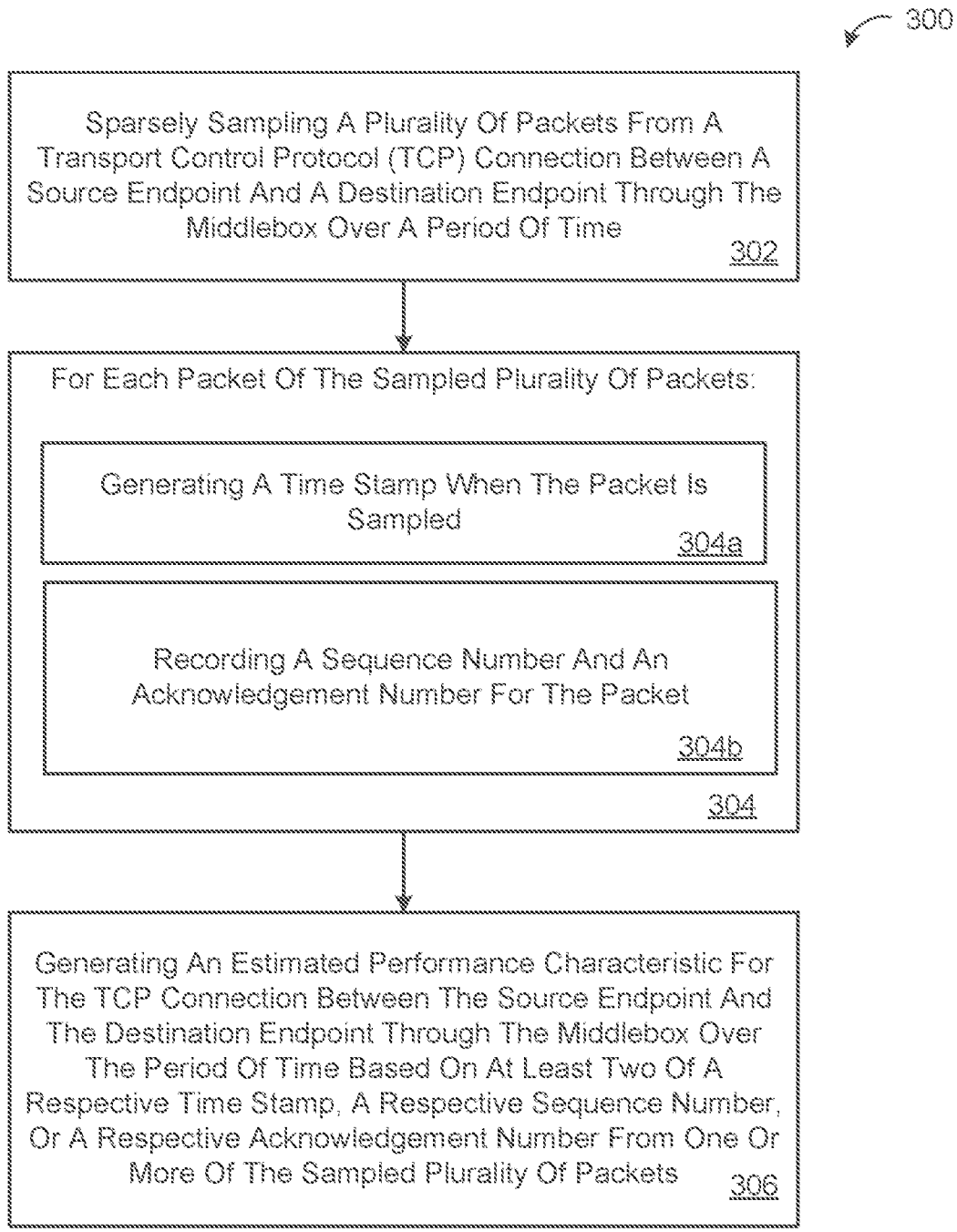
FIG. 3 is a flowchart of an example arrangement of operations for a method of estimating TCP performance.

FIG. 3 is a flowchart of an example arrangement of operations for a method 300 of estimating TCP performance characteristics 202. At operation 302, the method 300 sparsely samples a plurality of packets 170 from a TCP connection 180 between a source endpoint 190; and a destination endpoint $190_d$ through a middlebox 160 over a period of time t. At operations 304, the method 400 performs operations 304a-b for each sampled packet 170 of the sampled plurality of packets 170. At operation 304a, for each sampled packet 170, the method 300 generate a times stamp 212 when a respective packet 170 is sampled. At operation 304b, for each sampled packet 170, the method 300 records a sequence number 172 and an acknowledgment number 174 for the respective packet 170. Here, the acknowledgment packet 174 may not exist for the respective packet 170. At operation 306, the method 300 generates an estimated performance characteristic 202 for the TCP connection 180 between the source endpoint $190_s$ and the destination endpoint $190_d$ through the middlebox 160 over the period of time t based on at least two of a respective time stamp 212, a respective sequence number 172, or a respective acknowledgment number 174 from one or more of the sampled plurality of packets 170.

Figure 4:
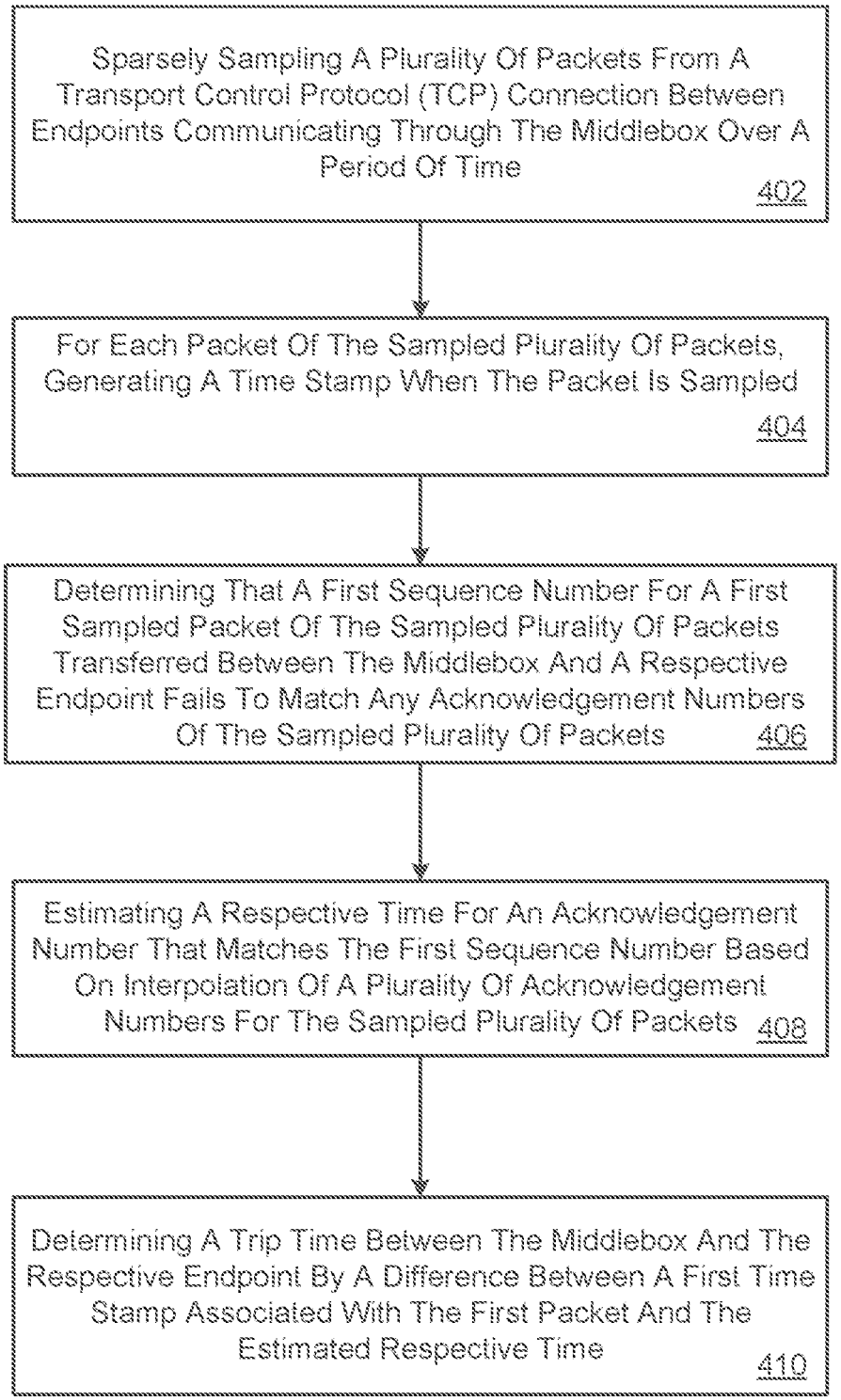
FIG. 4 is a flow-chart of an example arrangement of operations for a method of estimating TCP performance.

FIG. 4 is a flowchart of an example arrangement of operations for a method 400 of estimating trip time for a TCP connection 180. At operation 402, the method 400 sparsely samples at a middlebox 160 a plurality of packets 170 from a TCP connection 180 between endpoints 190 communicating through the middlebox 160 over a period of time t. For each sampled packet 170 of the sampled plurality of packets 170, at operation 404, the method 400 generates a time stamp 212 when a respective packet 170 is sampled. At operation 406, the method 400 determines that a first sequence number 172 for a first sampled packet 170 of the sampled plurality of packets 170 transferred between the middlebox 160 and a respective endpoint 190 fails to match any acknowledgment numbers 174 of the sampled plurality of packets 170. At operation 408, the method 400 estimates a respective time t for an acknowledgment number 174 that matches the first sequence number 172 based on interpolation of a plurality of acknowledgment numbers 174 for the sampled plurality of packets 170. At operation 410, the method 400 determines a trip time between the middlebox 160 and the respective endpoint 190 by a difference between a first time stamp 212 associated with the first packet 170 and the estimated respective time.

Figure 5:
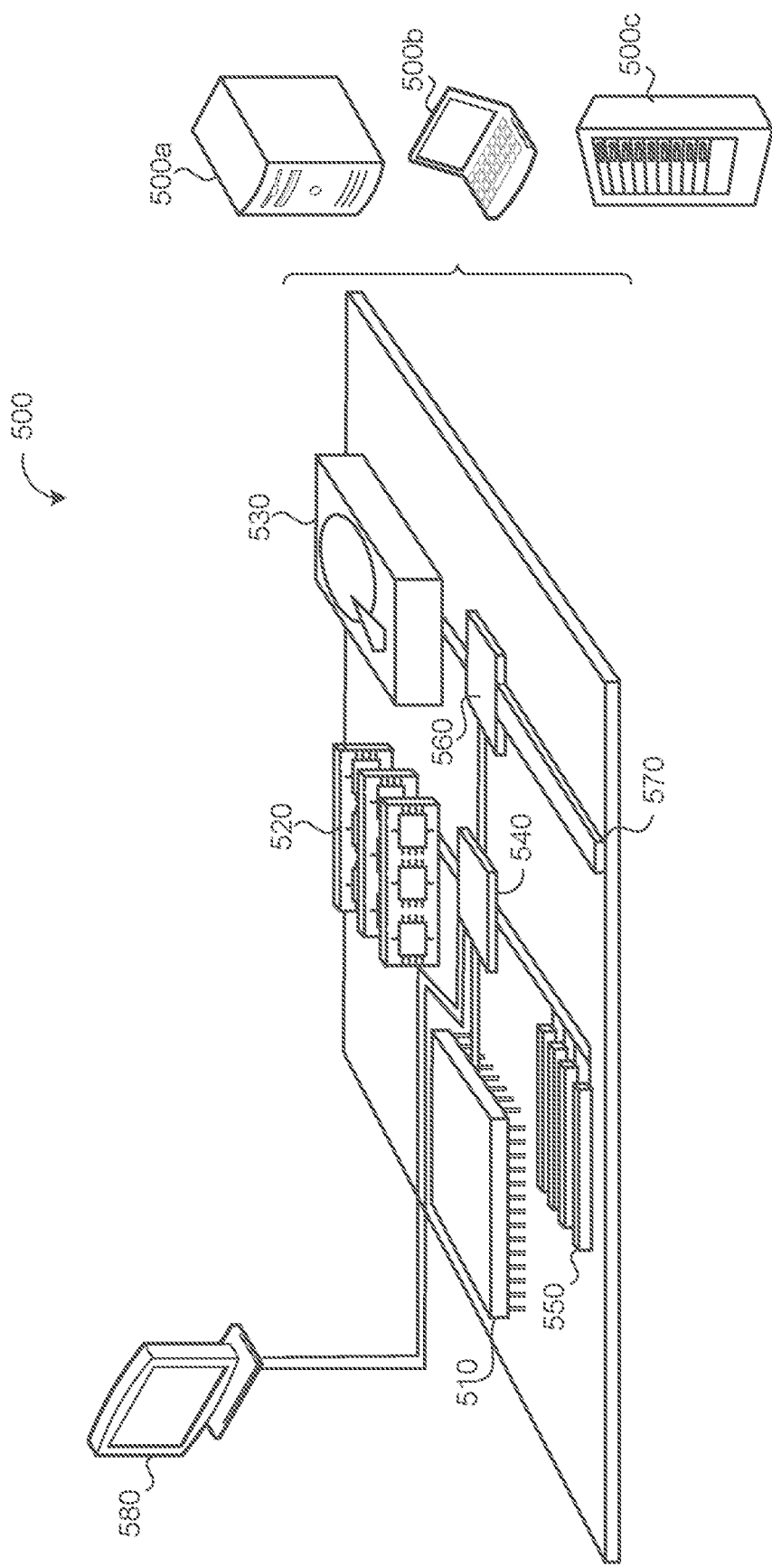
FIG. 5 is a schematic view of an example computing device used to implement the systems and methods of migrating virtual network functions.

FIG. 5 is schematic view of an example computing device 500 that may be used to implement the systems (e.g., the performance evaluator 200) and methods (e.g., methods 300, 400) described in this document the computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the aspects described and/or claimed in this document.

The computing device 500 includes a processor 510 (e.g, data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530,540, 550, and 560, are interconnected using various buses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 500, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g, internal hard disks or removable disks; magneto optical disks; and CD ROM and DVD-ROM disks. The processor and the memory can be supplemented by or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   sampling a plurality of packets from transport control protocol (TCP) connections between source endpoints and destination endpoints transiting through a middlebox over a period of time, each packet comprising a respective acknowledgment number;
   for each packet of the sampled plurality of packets, recording the respective acknowledgement number;
   determining a slope of a trend line of the respective acknowledgement numbers with respect to time; and
   generating an estimated performance characteristic for the TCP connections between the source endpoints and the destination endpoints transiting through the middlebox over the period of time, the estimated performance characteristic including a throughput for the TCP connections based on the slope of acknowledgement numbers.

2. The method of claim 1, wherein the operations further comprise determining a trip time between the middlebox and the destination endpoints based on a difference between respective time stamps generated for:
   a first packet of the sampled plurality of packets, the first packet having a first sequence number; and
   a second packet of the sampled plurality of packets, the respective acknowledgement number of the second packet having matching the first sequence number.

3. The method of claim 1, wherein the operations further comprise:
   estimating a respective time stamp for an un-sampled packet from the TCP connections by interpolating the acknowledgement numbers recorded for the sampled plurality of packets, the un-sampled packet associated with a corresponding acknowledgement number that matches a first sequence number of a first packet of the sampled plurality of packets; and
   determining a trip time between the middlebox and the destination endpoints based on a difference between a first time stamp generated for the first packet and the respective time stamp estimated for the un-sampled packet.

4. The method of claim 1, wherein generating the estimated performance characteristic for the TCP connections comprises calculating a round trip time between the source endpoints and the destination endpoints through the middlebox by summing trip times between:
   the middlebox and the destination endpoints; and
   the middlebox to the source endpoints.

5. The method of claim 1, wherein the operations further comprise, for an un-sampled packet from the TCP connections, estimating a respective time stamp based on an interpolation of the acknowledgement numbers recorded for the sampled plurality of packets.

6. The method of claim 1, wherein the operations further comprise, for an un-sampled packet from the TCP connections, estimating a respective time stamp based on an interpolation of sequence numbers recorded for the sampled plurality of packets.

7. The method of claim 1, wherein determining the slope of the trend line of the respective acknowledgement numbers over time comprises:
   for the sampled plurality of packets transferred from the destination endpoints to the source endpoints through the middlebox, determining the slope of the trend line of acknowledgement numbers based on the acknowledgement numbers recorded; and
   generating the throughput based on the slope of the trend line of the acknowledgement numbers, the throughput corresponding to a rate of packet transfer from the source endpoints to the destination endpoints through the middlebox.

8. The method of claim 1, wherein determining the slope of the trend line of the respective acknowledgement numbers over time comprises:
   determining the slope of the trend line of acknowledgement numbers based on the acknowledgement numbers recorded for the sampled plurality of packets transferred from the source endpoints to the destination endpoints through the middlebox; and
   generating the throughput based on the slope of the trend line of the acknowledgement numbers, the throughput corresponding to a rate of packet transfer from the destination endpoints to the source endpoints through the middlebox.

9. The method of claim 1, wherein, at a given instance in time, the operations further comprise:
   receiving a first packet communicated over the TCP connections from the source endpoints, the first packet comprising a first sequence number and a first acknowledgement number;
   receiving a second packet communicated over the TCP connections from the destination endpoints, the second packet comprising a second sequence number and a second acknowledgement number; and
   for the estimated performance characteristic for the TCP connections for the source endpoints, estimating a respective window size by determining a difference between the first sequence number associated with the first packet and the second acknowledgement number associated with the second packet.

10. The method of claim 9, wherein estimating the respective window size of the estimated performance characteristic for the TCP connections for the destination endpoints by determining a difference between the second sequence number associated with the second packet and the first acknowledgement number associated with the first packet.

11. A system comprising:
    data processing hardware; and
    memory hardware in communication with the data processing hardware, the memory hardware storing instructions that when executed on the data processing hardware cause the data processing hardware to perform operations comprising:
       sampling a plurality of packets from transport control protocol (TCP) connections between source endpoints and destination endpoints transiting through a middlebox over a period of time, each packet comprising a respective acknowledgment number;
       for each packet of the sampled plurality of packets, recording the respective acknowledgement number;
       determining a slope of a trend line of the respective acknowledgement numbers with respect to time; and
       generating an estimated performance characteristic for the TCP connections between the source endpoints and the destination endpoints transiting through the middlebox over the period of time, the estimated performance characteristic including a throughput for the TCP connections based on the slope of acknowledgement numbers.

12. The system of claim 11, wherein the operations further comprise determining a trip time between the middlebox and the destination endpoints based on a difference between respective time stamps generated for:
- a first packet of the sampled plurality of packets, the first packet having a first sequence number; and
- a second packet of the sampled plurality of packets, the respective acknowledgement number of the second packet having matching the first sequence number.

13. The system of claim 11, wherein the operations further comprise:
- estimating a respective time stamp for an un-sampled packet from the TCP connections by interpolating the acknowledgement numbers recorded for the sampled plurality of packets, the un-sampled packet associated with a corresponding acknowledgement number that matches a first sequence number of a first packet of the sampled plurality of packets; and
- determining a trip time between the middlebox and the destination endpoints based on a difference between a first time stamp generated for the first packet and the respective time stamp estimated for the un-sampled packet.

14. The system of claim 11, wherein generating the estimated performance characteristic for the TCP connections comprises calculating a round trip time between the source endpoints and the destination endpoints through the middlebox by summing trip times between:
- the middlebox and the destination endpoints; and
- the middlebox to the source endpoints.

15. The system of claim 11, wherein the operations further comprise, for an un-sampled packet from the TCP connections, estimating a respective time stamp based on an interpolation of the acknowledgement numbers recorded for the sampled plurality of packets.

16. The system of claim 11, wherein the operations further comprise, for an un-sampled packet from the TCP connections, estimating a respective time stamp based on an interpolation of sequence numbers recorded for the sampled plurality of packets.

17. The system of claim 11, wherein determining the slope of the trend line of the respective acknowledgement numbers over time comprises:
for the sampled plurality of packets transferred from the destination endpoints to the source endpoints through the middlebox, determining the slope of the trend line of acknowledgement numbers based on the acknowledgement numbers recorded; and
generating the throughput based on the slope of the trend line of the acknowledgement numbers, the throughput corresponding to a rate of packet transfer from the source endpoints to the destination endpoints through the middlebox.

18. The system of claim 11, wherein determining the slope of the trend line of the respective acknowledgement numbers over time comprises:
- determining the slope of the trend line of acknowledgement numbers based on the acknowledgement numbers recorded for the sampled plurality of packets transferred from the source endpoints to the destination endpoints through the middlebox; and
- generating the throughput based on the slope of the trend line of the acknowledgement numbers, the throughput corresponding to a rate of packet transfer from the destination endpoints to the source endpoints through the middlebox.

19. The system of claim 11, wherein, at a given instance in time, the operations further comprise:
- receiving a first packet communicated over the TCP connections from the source endpoints, the first packet comprising a first sequence number and a first acknowledgement number;
- receiving a second packet communicated over the TCP connections from the destination endpoints, the second packet comprising a second sequence number and a second acknowledgement number; and
- for the estimated performance characteristic for the TCP connections for the source endpoints, estimating a respective window size by determining a difference between the first sequence number associated with the first packet and the second acknowledgement number associated with the second packet.

20. The system of claim 19, wherein estimating the respective window size of the estimated performance characteristic for the TCP connections for the destination endpoints by determining a difference between the second sequence number associated with the second packet and the first acknowledgement number associated with the first packet.

* * * * *